US009747248B2

(12) United States Patent
Fadell

(10) Patent No.: US 9,747,248 B2
(45) Date of Patent: *Aug. 29, 2017

(54) WIRELESS COMMUNICATION SYSTEM

(75) Inventor: Anthony M. Fadell, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 648 days.

This patent is subject to a terminal disclaimer.

(21) Appl. No.: 13/303,021

(22) Filed: Nov. 22, 2011

(65) Prior Publication Data

US 2012/0071100 A1 Mar. 22, 2012

Related U.S. Application Data

(63) Continuation of application No. 12/760,479, filed on Apr. 14, 2010, now Pat. No. 8,072,956, which is a continuation of application No. 11/485,142, filed on Jul. 11, 2006, now Pat. No. 7,724,716.

(60) Provisional application No. 60/805,328, filed on Jun. 20, 2006.

(51) Int. Cl.
*H04W 4/00* (2009.01)
*G06F 15/02* (2006.01)
*G06Q 30/06* (2012.01)
*H04L 29/08* (2006.01)

(52) U.S. Cl.
CPC ........... *G06F 15/025* (2013.01); *G06Q 30/06* (2013.01); *G06Q 30/0601* (2013.01); *G06Q 30/0603* (2013.01); *H04L 67/04* (2013.01); *H04L 67/306* (2013.01); *H04L 67/322* (2013.01); *H04L 67/325* (2013.01)

(58) Field of Classification Search
CPC ...... H04W 84/12; H04W 84/18; H04W 80/04

USPC ............... 370/338, 328, 310; 455/414.1, 421
See application file for complete search history.

(56) References Cited

U.S. PATENT DOCUMENTS

| 4,090,216 A | 5/1978 | Constable |
| 4,386,345 A | 5/1983 | Narveson et al. |
| 4,451,849 A | 5/1984 | Fuhrer |

(Continued)

FOREIGN PATENT DOCUMENTS

| DE | 4334773 | 4/1994 |
| DE | 4445023 | 6/1996 |

(Continued)

OTHER PUBLICATIONS

Communication Relating to the Results of the Partial International Search Report, PCT/US2007/070906, mailed May 2, 2008.

(Continued)

*Primary Examiner* — Nghi H Ly
(74) *Attorney, Agent, or Firm* — DLA Piper LLP (US)

(57) ABSTRACT

A processing system is described that includes a wireless communication interface that wirelessly communicates with one or more wireless client devices in the vicinity of an establishment. The wireless communication interface receives a remote order corresponding to an item selected by at least one of the wireless client devices. A local server computer located in proximity to the establishment generates instructions for processing the remote order received from the wireless communication interface. The local server computer then passes the processing instructions to an order processing queue in preparation for processing of the remote order.

28 Claims, 20 Drawing Sheets

(56) References Cited

U.S. PATENT DOCUMENTS

| | | |
|---|---|---|
| 4,589,022 A | 5/1986 | Prince et al. |
| 4,908,523 A | 3/1990 | Snowden et al. |
| 4,928,307 A | 5/1990 | Lynn |
| 4,951,171 A | 8/1990 | Tran et al. |
| 5,185,906 A | 2/1993 | Brooks |
| 5,293,494 A | 3/1994 | Saito et al. |
| 5,379,057 A | 1/1995 | Clough |
| 5,406,305 A | 4/1995 | Shimomura et al. |
| 5,559,945 A | 9/1996 | Beaudet et al. |
| 5,566,337 A | 10/1996 | Szymanski et al. |
| 5,583,993 A | 12/1996 | Foster et al. |
| 5,608,698 A | 3/1997 | Yamanoi et al. |
| 5,616,876 A | 4/1997 | Cluts |
| 5,617,386 A | 4/1997 | Choi |
| 5,670,985 A | 9/1997 | Cappels, Sr. et al. |
| 5,675,362 A | 10/1997 | Clough |
| 5,684,513 A | 11/1997 | Decker |
| 5,710,922 A | 1/1998 | Alley et al. |
| 5,712,949 A | 1/1998 | Kato |
| 5,717,422 A | 2/1998 | Fergason |
| 5,721,949 A | 2/1998 | Smith et al. |
| 5,726,672 A | 3/1998 | Hernandez et al. |
| 5,739,451 A | 4/1998 | Winksy et al. |
| 5,740,143 A | 4/1998 | Suetomi |
| 5,760,588 A | 6/1998 | Bailey |
| 5,778,374 A | 7/1998 | Dang et al. |
| 5,803,786 A | 9/1998 | McCormick |
| 5,815,225 A | 9/1998 | Nelson |
| 5,822,288 A | 10/1998 | Shinada |
| 5,835,721 A | 11/1998 | Donahue et al. |
| 5,835,732 A | 11/1998 | Kikinis et al. |
| 5,838,969 A | 11/1998 | Jacklin et al. |
| 5,864,868 A | 1/1999 | Contois |
| 5,867,163 A | 2/1999 | Kurtenbach |
| 5,870,710 A | 2/1999 | Ozawa et al. |
| 5,918,303 A | 6/1999 | Yamaura et al. |
| 5,920,728 A | 7/1999 | Hallowell et al. |
| 5,923,757 A | 7/1999 | Hocker et al. |
| 5,952,992 A | 9/1999 | Helms |
| 6,006,274 A | 12/1999 | Hawkins et al. |
| 6,009,237 A | 12/1999 | Hirabayashi et al. |
| 6,011,585 A | 1/2000 | Anderson |
| 6,018,705 A | 1/2000 | Gaudet et al. |
| 6,041,023 A | 3/2000 | Lakhansign |
| 6,052,654 A | 4/2000 | Gaudet et al. |
| 6,108,426 A | 8/2000 | Stortz |
| 6,122,340 A | 9/2000 | Darley et al. |
| 6,158,019 A | 12/2000 | Squibb |
| 6,161,944 A | 12/2000 | Leman |
| 6,172,948 B1 | 1/2001 | Keller et al. |
| 6,179,432 B1 | 1/2001 | Zhang et al. |
| 6,185,163 B1 | 2/2001 | Bickford et al. |
| 6,191,939 B1 | 2/2001 | Burnett |
| 6,208,044 B1 | 3/2001 | Viswanadham et al. |
| 6,216,131 B1 | 4/2001 | Liu et al. |
| 6,217,183 B1 | 4/2001 | Shipman |
| 6,248,946 B1 | 6/2001 | Dwek |
| 6,295,541 B1 | 9/2001 | Bodnar et al. |
| 6,297,795 B1 | 10/2001 | Kato et al. |
| 6,298,314 B1 | 10/2001 | Blackadar et al. |
| 6,332,175 B1 | 12/2001 | Birrell et al. |
| 6,336,365 B1 | 1/2002 | Blackadar et al. |
| 6,336,727 B1 | 1/2002 | Kim |
| 6,341,316 B1 | 1/2002 | Kloba et al. |
| 6,357,147 B1 | 3/2002 | Darley et al. |
| 6,377,530 B1 | 4/2002 | Burrows |
| 6,452,610 B1 | 9/2002 | Reinhardt et al. |
| 6,467,924 B2 | 10/2002 | Shipman |
| 6,493,652 B1 | 12/2002 | Ohlenbusch et al. |
| 6,536,139 B2 | 3/2003 | Darley et al. |
| 6,549,497 B2 | 4/2003 | Miyamoto et al. |
| 6,560,903 B1 | 5/2003 | Darley |
| 6,587,127 B1 | 7/2003 | Leeke et al. |
| 6,587,403 B1 | 7/2003 | Keller et al. |
| 6,587,404 B1 | 7/2003 | Keller et al. |
| 6,605,038 B1 | 8/2003 | Teller et al. |
| 6,606,281 B2 | 8/2003 | Cowgill et al. |
| 6,611,607 B1 | 8/2003 | Davis et al. |
| 6,611,789 B1 | 8/2003 | Darley |
| 6,617,963 B1 | 9/2003 | Watters et al. |
| 6,621,768 B1 | 9/2003 | Keller et al. |
| 6,623,427 B2 | 9/2003 | Mandigo |
| 6,626,706 B2 | 9/2003 | Siddiqui et al. |
| 6,631,101 B1 | 10/2003 | Chan et al. |
| 6,693,612 B1 | 2/2004 | Matsumoto et al. |
| 6,731,312 B2 | 5/2004 | Robbin |
| 6,760,536 B1 | 7/2004 | Amir et al. |
| 6,762,741 B2 | 7/2004 | Weindorf |
| 6,775,539 B2 | 8/2004 | Deshpande |
| 6,781,611 B1 | 8/2004 | Richard |
| 6,794,566 B2 | 9/2004 | Pachet |
| 6,799,226 B1 | 9/2004 | Robbin et al. |
| 6,801,964 B1 | 10/2004 | Mahdavi |
| 6,832,373 B2 | 12/2004 | O'Neill |
| 6,844,511 B1 | 1/2005 | Hsu et al. |
| 6,851,952 B2 | 2/2005 | Ueshima et al. |
| 6,870,529 B1 | 3/2005 | Davis |
| 6,876,947 B1 | 4/2005 | Darley et al. |
| 6,882,955 B1 | 4/2005 | Ohlenbusch et al. |
| 6,886,749 B2 | 5/2005 | Chiba et al. |
| 6,898,550 B1 | 5/2005 | Backadar et al. |
| 6,901,261 B2 | 5/2005 | Banatre et al. |
| 6,911,971 B2 | 6/2005 | Suzuki et al. |
| 6,918,677 B2 | 7/2005 | Shipman |
| 6,931,377 B1 | 8/2005 | Seya |
| 6,934,812 B1 | 8/2005 | Robbin et al. |
| 6,950,087 B2 | 9/2005 | Knox et al. |
| 7,010,365 B2 | 3/2006 | Maymudes |
| 7,028,096 B1 | 4/2006 | Lee |
| 7,043,479 B2 | 5/2006 | Ireton |
| 7,046,230 B2 | 5/2006 | Zadesky |
| 7,050,790 B2 | 5/2006 | Yamaga |
| 7,062,225 B2 | 6/2006 | White |
| 7,076,561 B1 | 7/2006 | Rosenberg et al. |
| 7,084,856 B2 | 8/2006 | Huppi |
| 7,084,921 B1 | 8/2006 | Ogawa |
| 7,092,946 B2 | 8/2006 | Bodnar |
| 7,107,296 B2 | 9/2006 | Novak et al. |
| 7,119,267 B2 | 10/2006 | Hirade et al. |
| 7,124,125 B2 | 10/2006 | Cook et al. |
| 7,131,059 B2 | 10/2006 | Obrador |
| 7,143,241 B2 | 11/2006 | Hull |
| 7,146,437 B2 | 12/2006 | Robbin et al. |
| 7,149,813 B2 | 12/2006 | Flanagin et al. |
| 7,155,163 B2 | 12/2006 | Cannon et al. |
| 7,155,681 B2 | 12/2006 | Mansour et al. |
| 7,162,543 B2 | 1/2007 | Fischer et al. |
| 7,171,331 B2 | 1/2007 | Vock et al. |
| 7,187,948 B2 | 3/2007 | Alden |
| 7,190,883 B2 | 3/2007 | Yeo |
| 7,191,244 B2 | 3/2007 | Jennings et al. |
| 7,213,228 B2 | 5/2007 | Putterman et al. |
| 7,215,649 B2 | 5/2007 | Yu |
| 7,234,026 B2 | 6/2007 | Robbin et al. |
| 7,272,385 B2 | 9/2007 | Mirouze et al. |
| 7,277,928 B2 | 10/2007 | Lennon |
| 7,289,393 B2 | 10/2007 | Keller et al. |
| 7,301,857 B2 | 11/2007 | Shah et al. |
| 7,312,785 B2 | 12/2007 | Tsuk et al. |
| 7,343,317 B2 | 3/2008 | Jokinen et al. |
| 7,345,671 B2 | 3/2008 | Robbin et al. |
| 7,356,679 B1 | 4/2008 | Le et al. |
| 7,366,659 B2 | 4/2008 | Etter |
| 7,377,440 B2 | 5/2008 | Casey |
| 7,385,359 B2 | 6/2008 | Dowling et al. |
| 7,502,626 B1 | 3/2009 | Lemilainen |
| 7,508,535 B2 | 3/2009 | Hart et al. |
| 7,574,272 B2 | 8/2009 | Gibbs et al. |
| 7,590,773 B2 | 9/2009 | Robbin et al. |
| 7,593,782 B2 | 9/2009 | Jobs et al. |
| 7,620,363 B2 | 11/2009 | Spurgat et al. |
| 7,627,343 B2 | 12/2009 | Fadell et al. |
| 7,657,224 B2 | 2/2010 | Goldberg et al. |
| 7,664,558 B2 | 2/2010 | Lindahl et al. |

(56) References Cited

U.S. PATENT DOCUMENTS

| | | | |
|---|---|---|---|
| 7,686,215 B2 | 3/2010 | Jones et al. | |
| 7,724,716 B2 * | 5/2010 | Fadell | 370/338 |
| 7,747,781 B2 | 6/2010 | Maurya et al. | |
| 7,757,173 B2 | 7/2010 | Beaman | |
| 7,810,223 B2 | 10/2010 | Hemerick et al. | |
| 7,870,197 B2 | 1/2011 | Lewis et al. | |
| 8,024,419 B2 | 9/2011 | Gudorf | |
| 8,072,956 B2 * | 12/2011 | Fadell | 370/338 |
| 8,188,357 B2 | 5/2012 | Robbin et al. | |
| 8,288,641 B2 | 10/2012 | Wilson | |
| 8,663,106 B2 | 3/2014 | Stivoric et al. | |
| 8,689,113 B2 | 4/2014 | Eytchison et al. | |
| 9,274,576 B2 | 3/2016 | Janik et al. | |
| 2001/0013983 A1 | 8/2001 | Izawa et al. | |
| 2001/0018668 A1 | 8/2001 | Yanase et al. | |
| 2001/0029178 A1 | 10/2001 | Criss et al. | |
| 2001/0036224 A1 | 11/2001 | Demello et al. | |
| 2001/0037367 A1 | 11/2001 | Iyer | |
| 2001/0041021 A1 | 11/2001 | Boyle et al. | |
| 2001/0042107 A1 | 11/2001 | Palm | |
| 2002/0002413 A1 | 1/2002 | Tokue | |
| 2002/0013784 A1 | 1/2002 | Swanson | |
| 2002/0013818 A1 | 1/2002 | Yamaga | |
| 2002/0028683 A1 | 3/2002 | Banatre et al. | |
| 2002/0045961 A1 | 4/2002 | Gibbs et al. | |
| 2002/0046315 A1 | 4/2002 | Miller et al. | |
| 2002/0055934 A1 | 5/2002 | Lipscomb et al. | |
| 2002/0059440 A1 | 5/2002 | Hudson et al. | |
| 2002/0059499 A1 | 5/2002 | Hudson | |
| 2002/0090912 A1 | 7/2002 | Cannon et al. | |
| 2002/0109718 A1 | 8/2002 | Mansour et al. | |
| 2002/0116082 A1 | 8/2002 | Gudorf | |
| 2002/0116517 A1 | 8/2002 | Hudson et al. | |
| 2002/0122031 A1 | 9/2002 | Maglio et al. | |
| 2002/0123359 A1 | 9/2002 | Wei et al. | |
| 2002/0152045 A1 | 10/2002 | Dowling et al. | |
| 2002/0156833 A1 | 10/2002 | Maurya et al. | |
| 2002/0161865 A1 | 10/2002 | Nguyen | |
| 2002/0173273 A1 | 11/2002 | Spurgat et al. | |
| 2002/0174269 A1 | 11/2002 | Spurgat et al. | |
| 2002/0189426 A1 | 12/2002 | Hirade et al. | |
| 2002/0189429 A1 | 12/2002 | Qian et al. | |
| 2002/0198790 A1 | 12/2002 | Paulo et al. | |
| 2002/0199043 A1 | 12/2002 | Yin | |
| 2003/0002688 A1 | 1/2003 | Kanevsky et al. | |
| 2003/0007001 A1 | 1/2003 | Zimmerman | |
| 2003/0007464 A1 | 1/2003 | Balani | |
| 2003/0018799 A1 | 1/2003 | Eyal | |
| 2003/0037254 A1 | 2/2003 | Fischer et al. | |
| 2003/0046434 A1 | 3/2003 | Flanagin et al. | |
| 2003/0050092 A1 | 3/2003 | Yun | |
| 2003/0065680 A1 | 4/2003 | Hatakeyama | |
| 2003/0074457 A1 | 4/2003 | Kluth | |
| 2003/0076301 A1 | 4/2003 | Tsuk et al. | |
| 2003/0076306 A1 | 4/2003 | Zadesky et al. | |
| 2003/0079038 A1 | 4/2003 | Robbin et al. | |
| 2003/0095096 A1 | 5/2003 | Robbin et al. | |
| 2003/0097379 A1 | 5/2003 | Ireton | |
| 2003/0104835 A1 | 6/2003 | Douhet | |
| 2003/0126016 A1 * | 7/2003 | Asano | 705/15 |
| 2003/0127307 A1 | 7/2003 | Liu et al. | |
| 2003/0128192 A1 | 7/2003 | van Os | |
| 2003/0133694 A1 | 7/2003 | Yeo | |
| 2003/0153213 A1 | 8/2003 | Siddiqui et al. | |
| 2003/0156503 A1 | 8/2003 | Schilling et al. | |
| 2003/0167318 A1 | 9/2003 | Robbin et al. | |
| 2003/0176935 A1 | 9/2003 | Lian et al. | |
| 2003/0182100 A1 | 9/2003 | Plastina et al. | |
| 2003/0221541 A1 | 12/2003 | Platt | |
| 2003/0229490 A1 | 12/2003 | Etter | |
| 2003/0236695 A1 | 12/2003 | Litwin, Jr. | |
| 2004/0001395 A1 | 1/2004 | Keller et al. | |
| 2004/0001396 A1 | 1/2004 | Keller et al. | |
| 2004/0012556 A1 | 1/2004 | Yong et al. | |
| 2004/0055446 A1 | 3/2004 | Robbin et al. | |
| 2004/0066363 A1 | 4/2004 | Yamano et al. | |
| 2004/0069122 A1 | 4/2004 | Wilson | |
| 2004/0076086 A1 | 4/2004 | Keller | |
| 2004/0086120 A1 | 5/2004 | Akins, III et al. | |
| 2004/0094018 A1 | 5/2004 | Ueshima et al. | |
| 2004/0103411 A1 | 5/2004 | Thayer | |
| 2004/0125522 A1 | 7/2004 | Chiu et al. | |
| 2004/0128198 A1 | 7/2004 | Register et al. | |
| 2004/0139180 A1 | 7/2004 | White et al. | |
| 2004/0165302 A1 | 8/2004 | Lu | |
| 2004/0177063 A1 | 9/2004 | Weber et al. | |
| 2004/0198436 A1 | 10/2004 | Alden | |
| 2004/0199631 A1 | 10/2004 | Natsume et al. | |
| 2004/0210628 A1 | 10/2004 | Inkinen et al. | |
| 2004/0216108 A1 | 10/2004 | Robbin | |
| 2004/0224638 A1 | 11/2004 | Fadell et al. | |
| 2004/0225613 A1 * | 11/2004 | Narayanaswami et al. | 705/64 |
| 2004/0242224 A1 | 12/2004 | Janik et al. | |
| 2004/0246275 A1 | 12/2004 | Yoshihara et al. | |
| 2004/0255135 A1 | 12/2004 | Kitaya et al. | |
| 2004/0267825 A1 | 12/2004 | Novak et al. | |
| 2005/0015254 A1 | 1/2005 | Beaman | |
| 2005/0053365 A1 | 3/2005 | Adams et al. | |
| 2005/0060240 A1 | 3/2005 | Popofsky | |
| 2005/0060542 A1 | 3/2005 | Risan et al. | |
| 2005/0097595 A1 | 5/2005 | Lipsanen et al. | |
| 2005/0102191 A1 | 5/2005 | Heller et al. | |
| 2005/0107031 A1 | 5/2005 | Wood et al. | |
| 2005/0108754 A1 | 5/2005 | Carhart et al. | |
| 2005/0111820 A1 | 5/2005 | Matsumi et al. | |
| 2005/0122315 A1 | 6/2005 | Chalk et al. | |
| 2005/0123886 A1 | 6/2005 | Hua et al. | |
| 2005/0146534 A1 | 7/2005 | Fong et al. | |
| 2005/0149213 A1 | 7/2005 | Guzak et al. | |
| 2005/0152294 A1 | 7/2005 | Yu et al. | |
| 2005/0156047 A1 | 7/2005 | Chiba et al. | |
| 2005/0160270 A1 | 7/2005 | Goldberg et al. | |
| 2005/0166153 A1 | 7/2005 | Eytchison et al. | |
| 2005/0216855 A1 | 9/2005 | Kopra et al. | |
| 2005/0218303 A1 | 10/2005 | Poplin | |
| 2005/0234983 A1 | 10/2005 | Plastina et al. | |
| 2005/0245839 A1 | 11/2005 | Stivoric et al. | |
| 2005/0246324 A1 | 11/2005 | Paalasmaa et al. | |
| 2005/0248555 A1 | 11/2005 | Feng et al. | |
| 2005/0257169 A1 | 11/2005 | Tu | |
| 2005/0259064 A1 | 11/2005 | Sugino et al. | |
| 2005/0259219 A1 | 11/2005 | Helbrecht et al. | |
| 2005/0259524 A1 | 11/2005 | Yeh | |
| 2005/0270276 A1 | 12/2005 | Sugimoto et al. | |
| 2005/0288046 A1 | 12/2005 | Zhao et al. | |
| 2006/0013414 A1 | 1/2006 | Shih | |
| 2006/0025068 A1 | 2/2006 | Regan et al. | |
| 2006/0026424 A1 | 2/2006 | Eto | |
| 2006/0061563 A1 | 3/2006 | Fleck | |
| 2006/0068760 A1 | 3/2006 | Hameed et al. | |
| 2006/0071899 A1 | 4/2006 | Chang et al. | |
| 2006/0088228 A1 | 4/2006 | Marriot et al. | |
| 2006/0092122 A1 | 5/2006 | Yoshihara et al. | |
| 2006/0094409 A1 | 5/2006 | Inselberg | |
| 2006/0095502 A1 | 5/2006 | Lewis et al. | |
| 2006/0098320 A1 | 5/2006 | Koga et al. | |
| 2006/0100978 A1 | 5/2006 | Heller et al. | |
| 2006/0135883 A1 | 6/2006 | Jonsson et al. | |
| 2006/0143236 A1 | 6/2006 | Wu | |
| 2006/0145053 A1 | 7/2006 | Stevenson et al. | |
| 2006/0152382 A1 | 7/2006 | Hiltunen | |
| 2006/0155914 A1 | 7/2006 | Jobs et al. | |
| 2006/0168340 A1 | 7/2006 | Heller et al. | |
| 2006/0168351 A1 | 7/2006 | Ng et al. | |
| 2006/0170535 A1 | 8/2006 | Watters et al. | |
| 2006/0173974 A1 | 8/2006 | Tang | |
| 2006/0180668 A1 | 8/2006 | Casey | |
| 2006/0190577 A1 | 8/2006 | Yamada | |
| 2006/0190980 A1 | 8/2006 | Kikkoji et al. | |
| 2006/0218040 A1 * | 9/2006 | Sabapathypillai | 705/15 |
| 2006/0221057 A1 | 10/2006 | Fux et al. | |
| 2006/0221788 A1 | 10/2006 | Lindahl et al. | |
| 2006/0235864 A1 | 10/2006 | Hotelling | |
| 2006/0259758 A1 | 11/2006 | Deng et al. | |

(56) References Cited

U.S. PATENT DOCUMENTS

| | | |
|---|---|---|
| 2006/0265503 A1 | 11/2006 | Jones et al. |
| 2006/0272483 A1 | 12/2006 | Honeywell |
| 2006/0277336 A1 | 12/2006 | Lu et al. |
| 2007/0014536 A1 | 1/2007 | Hellman |
| 2007/0028009 A1 | 2/2007 | Robbin et al. |
| 2007/0038941 A1 | 2/2007 | Wysocki et al. |
| 2007/0060109 A1 | 3/2007 | Ramer et al. |
| 2007/0061759 A1 | 3/2007 | Klein, Jr. |
| 2007/0074118 A1 | 3/2007 | Robbin et al. |
| 2007/0084333 A1 | 4/2007 | Robbin et al. |
| 2007/0089057 A1 | 4/2007 | Kindig |
| 2007/0106660 A1 | 5/2007 | Stern et al. |
| 2007/0124679 A1 | 5/2007 | Jeong et al. |
| 2007/0124681 A1 | 5/2007 | Abbar et al. |
| 2007/0129062 A1 | 6/2007 | Pantalone et al. |
| 2007/0135225 A1 | 6/2007 | Nieminen et al. |
| 2007/0155307 A1 | 7/2007 | Ng et al. |
| 2007/0169087 A1 | 7/2007 | Fadell |
| 2007/0226384 A1 | 9/2007 | Robbin et al. |
| 2007/0239849 A1 | 10/2007 | Robbin et al. |
| 2007/0248311 A1 | 10/2007 | Wice et al. |
| 2007/0255163 A1 | 11/2007 | Prineppi |
| 2007/0271312 A1 | 11/2007 | Heller et al. |
| 2007/0291710 A1 | 12/2007 | Fadell |
| 2008/0055228 A1 | 3/2008 | Glen |
| 2008/0086494 A1 | 4/2008 | Heller et al. |
| 2008/0134287 A1 | 6/2008 | Gudorf et al. |
| 2008/0168185 A1 | 7/2008 | Robbin et al. |
| 2008/0168245 A1 | 7/2008 | Deatley et al. |
| 2008/0168391 A1 | 7/2008 | Robbin et al. |
| 2008/0168525 A1 | 7/2008 | Heller et al. |
| 2008/0288046 A1 | 11/2008 | Hemerick et al. |
| 2008/0305832 A1 | 12/2008 | Greenberg |
| 2009/0239573 A1 | 9/2009 | Kretz et al. |
| 2009/0241070 A1 | 9/2009 | Robbin et al. |
| 2010/0077338 A1 | 3/2010 | Matthews et al. |
| 2010/0198704 A1 | 8/2010 | Fadell |

FOREIGN PATENT DOCUMENTS

| | | |
|---|---|---|
| EP | 0127139 | 5/1984 |
| EP | 0578604 | 11/1997 |
| EP | 0813138 | 12/1997 |
| EP | 0863469 | 9/1998 |
| EP | 0917077 | 5/1999 |
| EP | 0 952 510 A | 10/1999 |
| EP | 0982732 | 3/2000 |
| EP | 1028425 | 8/2000 |
| EP | 1028426 | 8/2000 |
| EP | 1076302 | 2/2001 |
| EP | 0757437 | 6/2002 |
| EP | 1213643 | 6/2002 |
| EP | 1248414 | 10/2002 |
| EP | 1289197 | 3/2003 |
| EP | 1372133 | 12/2003 |
| EP | 1503363 | 2/2005 |
| EP | 1530115 | 5/2005 |
| EP | 1536612 | 6/2005 |
| EP | 1566743 | 8/2005 |
| EP | 1566948 | 8/2005 |
| EP | 1622293 | 2/2006 |
| EP | 1686496 | 8/2011 |
| GB | 2384399 | 2/2004 |
| GB | 2399639 | 5/2005 |
| GB | 2370208 | 6/2005 |
| JP | 5923610 | 5/1916 |
| JP | 2000090651 | 3/2000 |
| JP | 2000224099 | 8/2000 |
| JP | 2000285643 | 10/2000 |
| JP | 2000299834 | 10/2000 |
| JP | 2000311352 | 11/2000 |
| JP | 2000339864 | 12/2000 |
| JP | 2001236286 | 8/2001 |
| JP | 2001312338 | 11/2001 |
| JP | 2002076977 | 3/2002 |
| JP | 2002175467 | 6/2002 |
| JP | 2003188792 | 7/2003 |
| JP | 03228490 | 8/2003 |
| JP | 2003259333 | 9/2003 |
| JP | 2003319365 | 11/2003 |
| JP | 2004021720 | 1/2004 |
| JP | 2004219731 | 8/2004 |
| JP | 2004220420 | 8/2004 |
| JP | 04243386 | 9/2004 |
| JP | 6096520 | 4/2006 |
| JP | 8235774 | 10/2008 |
| JP | 9259532 | 11/2009 |
| JP | 9050676 | 9/2010 |
| KR | 20010076508 | 8/2001 |
| WO | WO 9516950 | 6/1995 |
| WO | WO 9817032 | 4/1998 |
| WO | WO 9928813 | 6/1999 |
| WO | WO 0022820 | 4/2000 |
| WO | WO 00/38443 A | 6/2000 |
| WO | WO 0133569 | 5/2001 |
| WO | WO 0165413 | 9/2001 |
| WO | WO 0167753 | 9/2001 |
| WO | WO 0225610 | 3/2002 |
| WO | WO 03023786 | 3/2003 |
| WO | WO 03036457 | 5/2003 |
| WO | WO 03036541 | 5/2003 |
| WO | WO 03067202 | 8/2003 |
| WO | WO 2004049182 | 6/2004 |
| WO | WO 2004055637 | 7/2004 |
| WO | WO 2004061850 | 7/2004 |
| WO | WO 2004077706 | 9/2004 |
| WO | WO 2004084413 | 9/2004 |
| WO | WO 2005031737 | 4/2005 |
| WO | WO 2005048644 | 5/2005 |
| WO | WO 2005008505 | 7/2005 |
| WO | WO 2005109781 | 11/2005 |
| WO | WO 2006040737 | 4/2006 |
| WO | WO 2006071364 | 6/2006 |
| WO | WO 2006108104 | 10/2006 |

OTHER PUBLICATIONS

International Search Report and Written Opinion for PCT/US2007/070906, mailed Jun. 30, 2008.
Office Action for U.S. Appl. No. 11/485,142 mailed Aug. 3, 2009.
Office Action for Australian Patent Application No. 2007261116, dated Dec. 24, 2009.
Notice of Allowance for Australian Patent Application No. 2007261116, dated May 12, 2011.
Communication pursuant to Article 94(3) EPC for European Patent Application No. 07798392.2, dated Nov. 5, 2010.
Office Action for Australian Patent Application No. 2007261116, dated Jan. 10, 2011.
Notice of Allowance for U.S. Appl. No. 11/485,142 mailed Jan. 7, 2010.
Office Action for U.S. Appl. No. 12/760,479 mailed Feb. 17, 2011.
Notice of Allowance for U.S. Appl. No. 12/760,479 mailed Aug. 5, 2011.
"Apple Announces iTunes 2," Press Release, Apple Computer, Inc., Oct. 23, 2001.
"Apple Introduces iTunes—World's Best and Easiest To Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"Digital Still Cameras—Downloading Images to a Computer," Mimi Chakarova et al., Multi-Media Reporting and Convergence, 2 pgs.
Adam C. Engst, "SoundJam Keeps on Jammin'," Jun. 19, 2000, http://db.tidbits.com/getbits.acgi?tbart=05988.

(56) References Cited

OTHER PUBLICATIONS

Andrew Birrell, "Personal Jukebox (PJB)," Oct. 13, 2000, http://birrell.org/andrew/talks/pbj-overview.ppt.
Compaq, "Personal Jukebox," Jan. 24, 2001, http://research.compaq.com/SRC/pjb/. De Herrera, Chris, Microsoft ActiveSync 3.1, Version 1.02, Oct. 13, 2000.
IEEE 1394—Wikipedia, 1995, http://www.wikipedia.org/wiki/Firewire.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Miniman, "Applian Software's Replay Radio and Player v1.02," Product review, pocketnow.com, http://www.pocketnow.com/reviews/replay/replay.htm, Jul. 21, 2001.
Musicmatch, "Musicmatch and Xing Technology Introduce Musicmatch Jukebox," May 18, 1998, http://www.musicmatch.com/info/company/press/releases/?year=1998$release=2.
Personal Jukebox (PJB), "Systems Research Center and PAAD," Compaq Computer Corp., Oct. 13, 2000, http://research.compaq.com/SRC/pjb/.
Sinitsyn, Alexander, "A Synchronization Framework for Personal Mobile Servers," Pervasive Computing and Communications Workshops, 2004. Proceedings of the Second IEEE Annual Conference on, Piscataway, NJ, USA, IEEE, Mar. 14, 2004, pp. 208-212.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
"Creative Zen Vision: M 30GB", Dec. 21, 2005; downloaded on Jan. 11, 2008 from http://web.archive.org/web/20051221050140/http://www.everthingusb.com/creative_zen_vision:m_30gb.html>.
Kadir et al., "Adaptive Fast Playback-Based Video Skimming Using a Compressed-Domain Visual Complexity Measure", 2004 IEEE Intl Conference on Multimedia and Expo, pp. 2055-2058.
Yee et al., "Faceted Metadata for Image Search and Browsing." Association For Computing Machinery, Conference Proceedings, Apr. 5, 2003.
Apple iTunes Smart Playlists, downloaded Apr. 5, 2005 from http://web.archive.org/web/20031002011316/www.apple.com/itunes/smartplaylists.. pp. 1-2.
iTunes, Wikipedia, the free encyclopedia; downloaded on Oct. 5, 2005, pp. 1-6.
Nutzel et al., "Sharing Systems for Future HiFi Systems", The Computer Society, Jun. 2004.
Hart-Daves, Guy, "How To Do Everything with Your IPod & Mini IPod Mini", 2004, McGraw-Hill Professional, p. 33.
"Creative liefert erstes Portable Media Center aus" [Online] Sep. 2, 2004, Retrieved from the internet on Sep. 20, 2007 from http://www.golem.de/0v09/33347.html>.
"Combination Belt Clip Leaf Spring and Housing Latch", Wandt et al.; Motorola Technical Developments, Motorola Inc. Schaumburg, IL. vol. 18, Mar. 1, 1993.
"12.1" 925 Candela Mobile PC, downloaded from LCDHardware.com on Dec. 19, 2002, http://www.lcdharware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.

"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Eluminx Illuminated Keyboard", downloaded Dec. 19, 2002, http://www.elumix.com/.
"How To Pair a Bluetooth Headset & Cell Phone", About.com: downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly/Optical Fiber Optic Membrane Switch Backlighting", downloaded Dec. 19, 2002, http://www.poly/optical.com/membrane_switches.html.
"Public Safety Technologies Tracer 2000 Computer", downloaded Dec. 19, 2002, http://www.pst911.com/traver.html.
"QuickTime Movie Playback Programming Guide", Apple Computer, Inc., Aug. 11, 2005.
"QuickTime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from http://www.sonyericsson.com/spg.jsp?cc=global&lc=en&ver=4001&template=pc3_1_1&z . . . .
"Taos, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http:www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built/in Pedometer, Oregon Scientific, downloaded on Jul. 31, 2006 from http://www2.oregonscientific.com/shop/product.asp?cid=4&scid=11&pid=581.
Alex Veiga, "AT&T Wireless Launching Music Service," Yahoo! Finance, Oct. 5, 2004, pp. 1/2.
Apple iPod Technical Specifications, iPod 20GB and 60GB Mac + PC, downloaded from http://www.apple.com/ipod/color/specs.html on Aug. 8, 2005.
Bociurkiw, Michael, "Product Guide: Vanessa Matz,", www.forbes.com/asap/2000/1127/vmartz_print.html, Nov. 27, 2000.
Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].
Creative: "Creative NOMAD MuVo," www.creative.com, Nov. 1, 2004, http://web.archive.org/web/20041024075901/www.creative.com/products/product.asp?category=213&subcategory=215&product=110 [downloaded Jun. 7, 2006].
iAP Sports Lingo 0x09 Protocol V1.00, May 1, 2006.
Jabra Bluetooth Headset User Manual; GN Netcom A/s, 2005.
Jabra Bluetooth Introduction: GN Netcom A/S Oct. 2004.
Jabra FreeSpeak BT200 User Manual; Jabra Corporation, 2002.
Kennedy, "Digital Data Storage Using Video Disc," IBM Technical Disclosure Bulletin, vol. 24, No. 2, Jul. 1981.
Nonhoff/Arps, et al., "Straßenmusik Portable MP3/Spieler mit USB/Anschluss," CT Magazin Fuer Computer Technik, Verlag Heise GMBH, Hannover DE, No. 25, Dec. 4, 2000.
Peter Lewis, "Two New Ways to Buy Your Bits," CNN Money, Dec. 31, 2003, pp. 1/4.
Sastry, Ravindra Wadali. "A Need for Speed: A New Speedometer for Runners", submitted to the Department of Electrical Engineering and Computer Science at the Massachusetts Institute of Technology, May 28, 1999.

(56) References Cited

OTHER PUBLICATIONS

Spiller, Karen. "Low/decibel earbuds keep noise at a reasonable level", The Telegraph Online, dated Aug. 13, 2006, http://www.nashuatelegraph.com/apps/pbcs.dll/articl?Date=20060813&Cate . . . Downloaded Aug. 16, 2006.

Waterproof Music Player with FM Radio and Pedometer User Manual, Oregon Scientific, 2005.

De Herrera, Chris, Microsoft ActiveSync 3.1, Version 1.02, Oct. 13, 2000.

Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

\* cited by examiner

WIRELESS COMMUNICATION SYSTEM

CROSS-REFERENCE TO RELATED APPLICATIONS

This application is a continuation of U.S. patent application Ser. No. 12/760,479, filed Apr. 14, 2010 now U.S. Pat. No. 8,072,956, and entitled "WIRELESS COMMUNICATION SYSTEM," which is hereby incorporated by reference herein, which in turn is a continuation of U.S. patent application Ser. No. 11/485,142, filed Jul. 11, 2006 now U.S. Pat. No. 7,724,716, and entitled "WIRELESS COMMUNICATION SYSTEM," which is hereby incorporated by reference herein, and which in turn claims priority to U.S. Provisional Patent Application No. 60/805,328, filed Jun. 20, 2006, and entitled "WIRELESS COMMUNICATION SYSTEM," which is hereby incorporated by reference herein.

FIELD OF INVENTION

This invention relates generally to personal, portable electronic devices such as media players, radios, cell phones and the like.

DESCRIPTION OF RELATED ART

Recent developments in consumer electronics have included the introduction of portable personal communication devices such as media players (such as MP3 players, minidisk players), cell phones, personal digital assistants (PDAs) and the like. In the case of a cell phone, a user can communicate by voice, text, or other multimedia data. For example, a cell phone user can send a text message by means of any number of communication protocols such as the Short Message Service—Point to Point (SMS-PP) protocol (defined in GSM recommendation 03.40). Using SMS-PP, messages are sent via a store-and-forward mechanism to a Short Message Service Center (SMSC), which will attempt to send the message to the recipient and possibly retry if the user is not reachable at a given moment.

Using a cell phone or other such device to remotely enter into a commercial transaction (such as food or drink ordering) is widespread and well understood. However, in order to initiate such a remote transaction using a cell phone, a user must be aware that a merchant of interest is nearby, must be aware of a list of available items for purchase by the merchant, must be aware of a price for each item, etc. Even in those cases where all the relevant knowledge is available and known, the user must then pay for the services or goods purchases. In some cases, the user must use a credit or debit card by repeating very sensitive information in a voice loud enough to be heard and understood over the phone, or enter the information manually if speaking is not an option. In some cases, if the merchant does not accept the particular payment method, the customer must pay using cash thereby eliminating most, if not all, of the perceived efficiencies of remotely ordering using the cell phone, PDA, media player, etc.

In any case, once the transaction is entered into, the customer order is then queued up in, typically, a first in first out order without distinguishing if the order was placed locally or remotely. In this way, a remote purchaser has only an approximate idea of a time to actually retrieve the order. This can result in an annoying wait in a long queue if the purchaser arrives before completion of the order. In the case of a food and/or drink purchase, a hot drink such as coffee is picked up in a tepid state if the purchaser arrives substantially after the ordered hot drink is ready for pickup.

Therefore, there is a need for improved approaches to process a remote order.

SUMMARY OF THE INVENTION

A processing system is described that includes a wireless communication interface that wirelessly communicates with one or more wireless client devices in the vicinity of an establishment. The wireless communication interface receives a remote order corresponding to an item selected by at least one of the wireless client devices. A local server computer located in proximity to the establishment receives the remote order from the wireless communication interface and generates instructions for processing the remote order. The local server computer then passes the processing instructions to an order processing queue in preparation for processing of the remote order.

In one embodiment, an acknowledgement is forwarded to the originating wireless client device indicating that the remote order has been successfully received. Furthermore, an estimate order completion time can then visually displayed by the wireless client device and/or audibly rendered by way of a speaker or earphone.

In another embodiment, a method can order an item from an establishment using a wireless client device in the vicinity of the establishment. The method can, for example, perform the operations of: presenting, on a display screen of the wireless client device, an item ordering user interface provided that the wireless client device is located proximate to the establishment; receiving, at the wireless client device, a user selection of a particular item of a plurality of items available for ordering via the item ordering user interface; forming, at the wireless client device, a remote order request for the particular item in response to the user selection; wirelessly sending the remote order request to a computing device associated with the establishment; wirelessly receiving, at the wireless client device, a notification from the computing device associated with the establishment; and presenting the notification on the display screen of the wireless client device.

In another embodiment, a non-transitory computer readable medium can include at least computer program code that when executed by a wireless client device provides for ordering an item from an establishment, The computer program code provided on the computer readable medium includes at least: computer program code for presenting, on a display screen of the wireless client device, an item ordering user interface provided that the wireless client device is located proximate to the establishment; computer program code for receiving, at the wireless client device, a user selection of a particular item of a plurality of items available for ordering via the item ordering user interface; computer program code for forming, at the wireless client device, a remote order request for the particular item in response to the user selection; computer program code for wirelessly sending the remote order request to a computing device associated with the establishment; computer program code for wirelessly receiving, at the wireless client device, a notification from the computing device associated with the establishment; and computer program code for presenting the notification on the display screen of the wireless client device.

In still another embodiment, a wireless portable electronic device can, for example, include at least: a processor for processing executable instructions; a display coupled to the processor for displaying text and images; a wireless interface coupled to the processor arranged to send and receive wireless signals; and a memory arranged to store data and the executable instructions. The executable instructions can, for example, include at least: computer program code for presenting, on the display of the wireless portable electronic device, an item ordering user interface provided that the wireless portable electronic device is located proximate to the establishment; computer program code for receiving a user selection of a particular item of a plurality of items available for ordering via the item ordering user interface; computer program code for forming a remote order request for the particular item in response to the user selection; computer program code for sending, via the wireless interface, the remote order request to a computing device associated with the establishment; computer program code for receiving, via the wireless interface, a notification from the computing device associated with the establishment; and computer program code for presenting the notification on the display screen of the wireless client device.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a particular embodiment of the invention, an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Embodiments of the invention can provide a method, system, and apparatus for wirelessly executing a commercial transaction using a wireless client device such as a cell phone or wireless portable media player. When within wireless range of a participating merchant, at least one of a number of selectable items is selected for purchase. An indication of the selected item is then wirelessly forwarded to the participating merchant who confirms that there are sufficient financial resources available to the consumer to complete the transaction. The selected item(s) are then placed in a priority queue. In a particularly useful embodiment, a time for pickup is forwarded to the wireless consumer product and visually displayed by the wireless client device and/or audibly rendered by way of a speaker or earphone.

The invention will now be described in terms of a client device that includes a portable media player capable of storing a number of multimedia digital data files connected to a media delivery accessory arranged to broadcast audio by way of a plurality of speakers. In the case of the media player being a pocket sized portable player (such as the iPod® player manufactured by Apple Inc. of Cupertino, Calif.), the multimedia data files can include MP3 files as well as any other appropriately formatted data files. It should be noted that although the described embodiments rely upon using a wireless portable media player, any personal communication device (such as a text message enabled cell phone) can be used to practice the invention.

Figure 1:
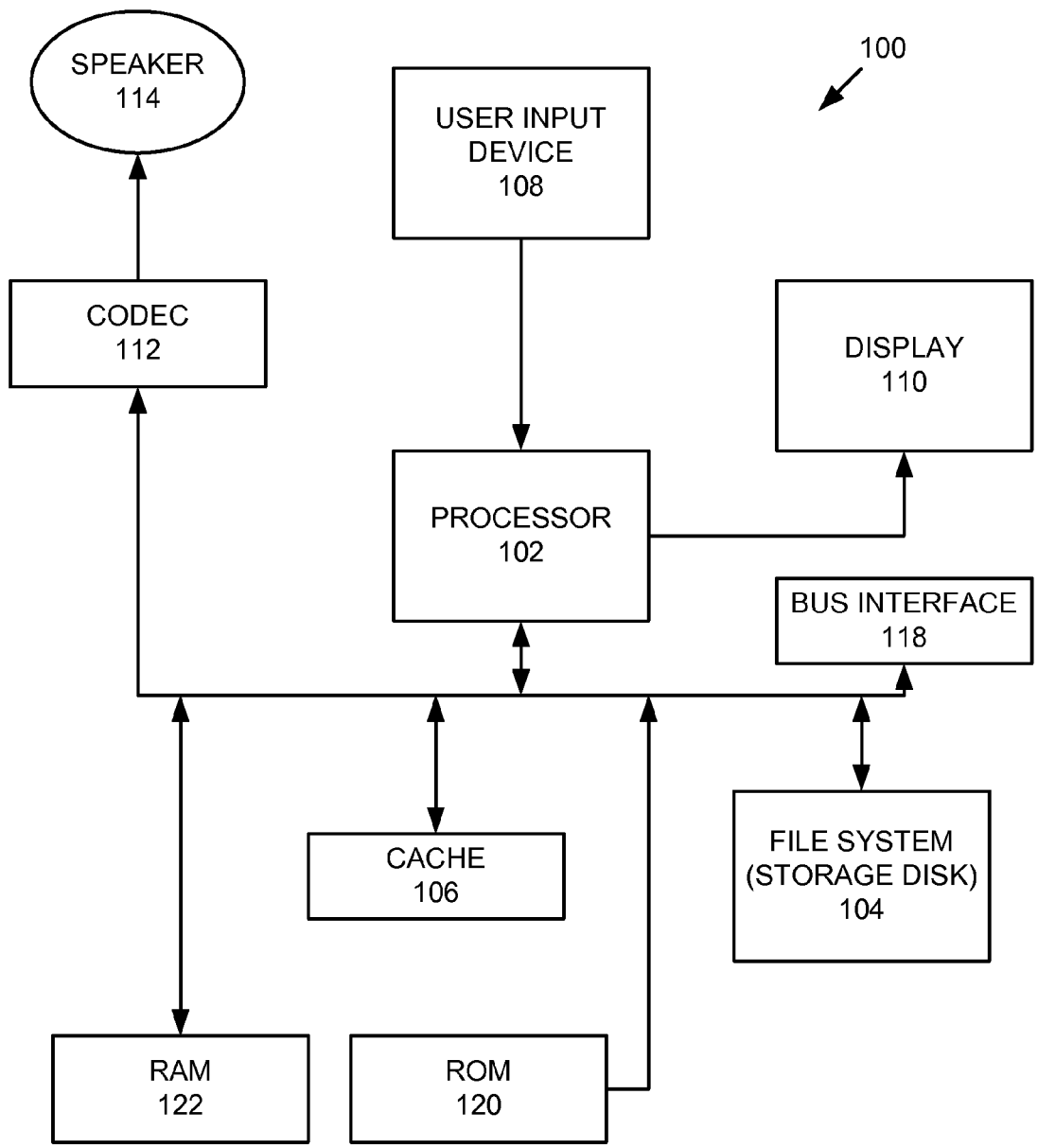
FIG. 1 shows a portable media player according to one embodiment of the invention.

FIG. 1 shows a portable media player 100 according to one embodiment of the invention. The media player 100 includes a processor 102 that pertains to a microprocessor or controller for controlling the overall operation of the media player 100. The media player 100 stores media data pertaining to media assets in a file system 104 and a cache 106. The file system 104 is, typically, a storage disk or a plurality of disks. The file system 104 typically provides high capacity storage capability for the media player 100. However, since the access time to the file system 104 is relatively slow, the media player 100 can also include a cache 106. The cache 106 is, for example, Random-Access Memory (RAM) provided by semiconductor memory. The relative access time to the cache 106 is substantially shorter than for the file system 104. However, the cache 106 does not have the large storage capacity of the file system 104. Further, the file system 104, when active, consumes more power than does the cache 106. The power consumption is particularly important when the media player 100 is a portable media player that is powered by a battery (not shown). The media player 100 also includes a RAM 120 and a Read-Only Memory (ROM) 122. The ROM 122 can store programs, utilities or processes to be executed in a non-volatile manner. The RAM 120 provides volatile data storage, such as for the cache 106.

The media player 100 also includes a user input device 108 that allows a user of the media player 100 to interact with the media player 100. For example, the user input device 108 can take a variety of forms, such as a button, keypad, dial, etc. Still further, the media player 100 includes a display 110 (screen display) that can be controlled by the processor 102 to display information to the user. A data bus 124 can facilitate data transfer between at least the file system 104, the cache 106, and the processor 102. The media player 100 also includes a bus interface 116 that couples to a data link 118. The data link 118 allows the media player 100 to couple to a host computer over a wired connection.

In one embodiment, the media player 100 serves to store a plurality of media assets (e.g., songs) in the file system 104. When a user desires to have the media player 100 play a particular media item, a list of available media assets is displayed on the display 110. Then, using the user input device 108, a user can select one of the available media assets. The processor 102, upon receiving a selection of a particular media item, supplies the media data (e.g., audio file) for the particular media item to a coder/decoder (CODEC) 112. The CODEC 112 then produces analog output signals for a speaker 114. The speaker 114 can be a speaker internal to the media player 100 or external to the media player 100. For example, headphones or earphones that connect to the media player 100 would be considered an external speaker.

The media player 100 also includes a wireless network interface 126 arranged to wirelessly transmit any selected data from the media player 100 to any appropriately configured receiver unit over a wireless network. In the embodiment shown in FIG. 1, the wireless network interface 126 takes the form of a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard.

In one embodiment, the media player 100 is a portable computing device dedicated to processing media such as audio. For example, the media player 100 can be a media player (e.g., MP3 player), a game player, a remote controller, a portable communication device, and the like. These devices are generally battery-operated and highly portable so as to allow a user to listen to music, play games or video, record video or take pictures, communicate with others, and/or control other devices. In one implementation, the media player 100 is a handheld device that is sized for placement into a pocket or hand of the user. By being handheld, the media player 100 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the user's hands, no reference surface such as a desktop is needed.

Although the media items of emphasis in several of the above embodiments were audio items (e.g., audio files or songs), the media items are not limited to audio items. For example, the media item can alternatively pertain to recorded discussions and the like.

Figure 2A:
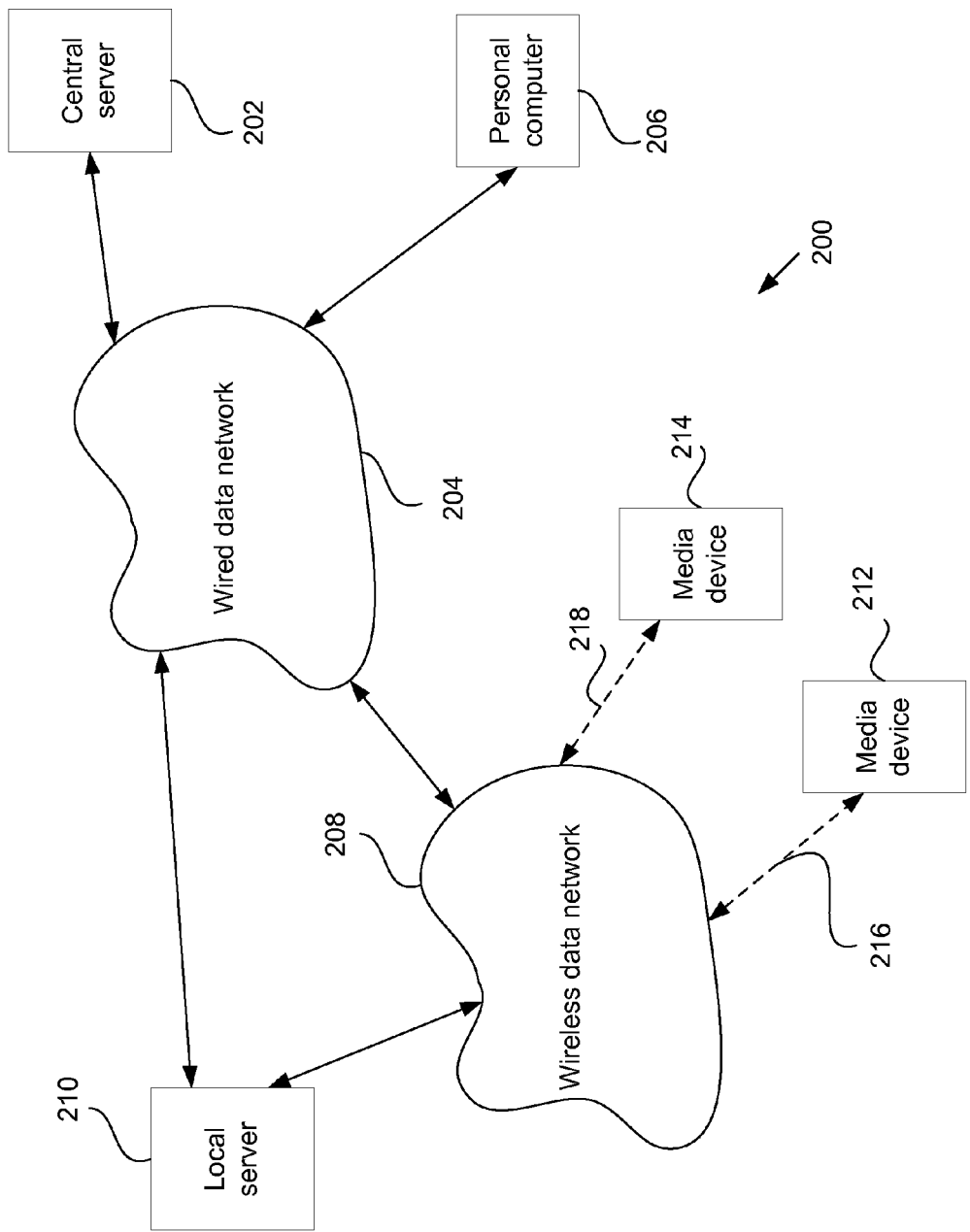
FIG. 2A is a block diagram of a wireless system according to one embodiment of the invention.

FIG. 2A is a block diagram of a wireless system 200 according to one embodiment of the invention. The system 200 includes a central server 202 and a wired data network 204. The central media server 202 couples to the wired data network 204. The wired data network 204 can be a global network, a wide area network, or a local area network. In one example, the wired data network 204 pertains to some portion of the World Wide Web. A personal computer 206 can couple to the wired data network 204. A wireless data network 208 can also couple to the wired data network 204. The wireless data network 208 can include one or more wireless data networks, such as cellular networks, WiFi networks, WiMAX networks, Bluetooth networks, etc. The wireless system 200 can also include a local server 210 that can couple to one or both of the wired data network 204 and the wireless data network 208.

The central server 202 stores or has access to numerous product data items. The local server 210 also stores or has access to various product data items. In addition, the system 200 supports a plurality of portable media devices 212 and 214. The portable media device 212 can couple to the wireless data network 208 over a wireless link 216. Similarly, the portable media device 214 can couple to the wireless data network 208 over a wireless link 218. In this regard, the portable media devices 212 and 214 can access the central media server 202 and/or the local server 210 via the wireless data network 208.

Figure 3:
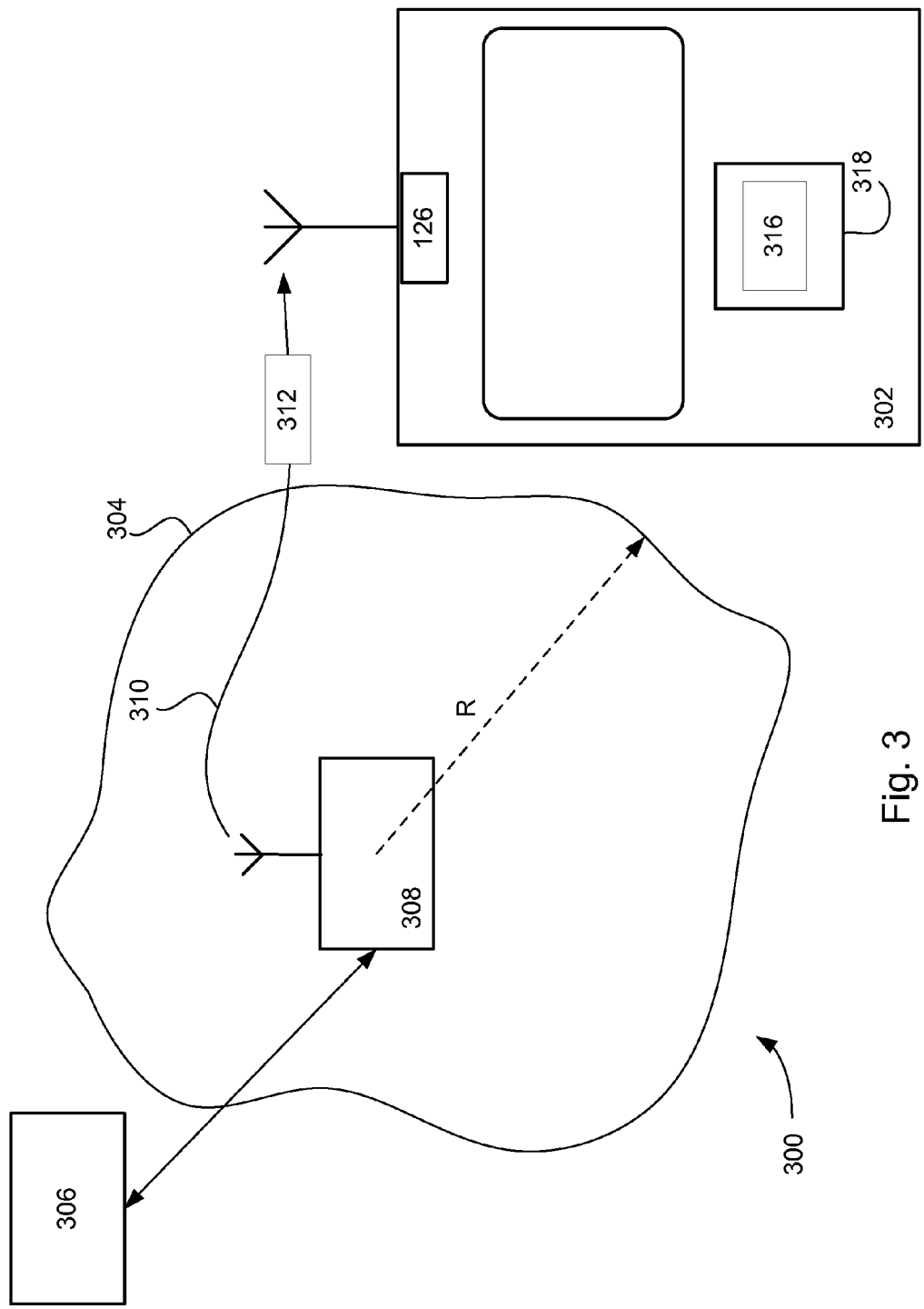
FIG. 3 shows a wireless communication system in accordance with an embodiment of the invention.

In one embodiment, one or more of the mobile devices, such as the mobile devices 212 and 214 illustrated in FIG. 3, can pertain to media devices. More particularly, the media devices can pertain to media players, such as the iPod® media player from Apple Inc. These mobile devices can include a purchase transaction management application that operates on the mobile device to facilitate a purchase transaction between the mobile device and a merchant with access to the servers 202 and/or 210. Given the portability of mobile devices, mobile devices are smaller and have less resources. Consequently, a purchase transaction management application designed for use on a mobile device may offer less features and capabilities than would a counterpart purchase transaction management application operating on a larger, more powerful computing device, e.g., a personal computer. Given that the mobile devices have wireless access to the local server 210 and/or the central server 202, the mobile devices can interact with the servers 202 and 210 to request and/or receive product data (or other data). In this regard, a purchase transaction management application operating on the mobile devices can communicate with the media servers 202 and 210 to perform various tasks, including: selecting items to purchase, receiving a periodic delivery of product content to media devices (such as daily pushing advertisements from a server to a media device), etc.

Figure 2B:
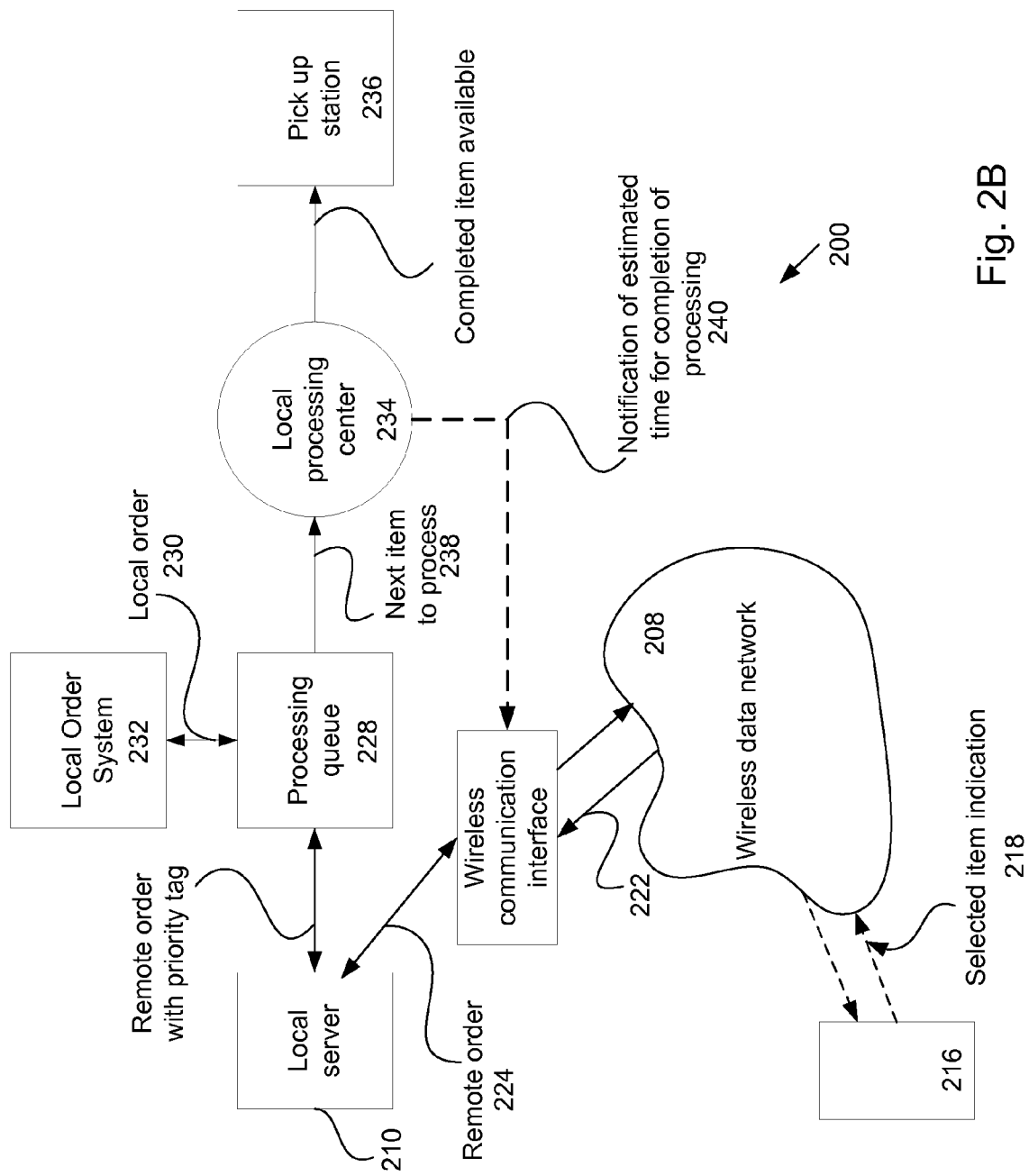
FIG. 2B is a block diagram of the wireless system shown in FIG. 2A suitably configured for receiving and processing a remote order from a wireless client device.

FIG. 2B is a block diagram of the wireless system 200 shown in FIG. 2A suitably configured for receiving and processing a remote order from a wireless client device. The system 200 includes the local server computer 210 located at an establishment 220 in wireless communication with the wireless data network 208 by way of a wireless communication interface 222. When the local server computer 210 receives a remote order 224 by way of the wireless communication interface 222, the local server computer 210 generates a tagged remote order entry 226 that determines an order of processing of the remote order 224. The tagged remote order entry 226 is, in turn, sent to and stored in a processing queue 228 that also receives any local order entries 230 from a local ordering system 232. In the described embodiment, the processing queue 228 is updated based upon whether or not a particular order entry is tagged. For example, if a local order entry is currently stored in the processing queue 228 and a next queue entry is a tagged order entry, then the tagged order entry takes priority over the local (untagged) order entry for processing by a local processing center 234. In this way, the establishment can prioritize, not, processing of remote orders over local orders as appropriate for pick up at a pick up station 236 when completed. In a particularly useful implementation, once the processing queue 228 has forwarded a next item to process command 238 to the local processing center 234, the local processing center 234 originates and forwards a notification of estimated time for completion of processing 240 to the wireless client device 216 by way of the wireless communication interface 222 and wireless data network 208.

FIG. 3 shows a wireless communication system 300 in accordance with an embodiment of the invention. The system 300 includes a wireless mobile device 302 capable of wireless communication with a wireless network 304 in communication with a local server computer 306 associated with a merchant 308. In the particular embodiment described, the merchant 308 primarily provides ready to eat comestibles (such as coffee, sandwiches, etc.) and any associated peripheral products (such as coffee grinders in the case of the merchant 308 being a purveyor of coffee and/or coffee products). In order to alert the wireless mobile device 302 that the wireless mobile device 302 is within range R of the wireless network 304, the wireless network 304 periodically emits a ping signal 310 that includes a merchant ID 312 that uniquely identifies the merchant 308. The ping signal 310 is arranged such that any compatible wireless mobile devices within the range R of the wireless network 304 will receive the ping signal 310 at a signal strength greater than a preset threshold value.

If the wireless mobile device 302 receives such a signal, then the wireless mobile device 302 responds (or not) to the wireless network 304 based upon any number of predetermined conditions set forth in a customer preference file 316 stored in a memory 318 in the wireless mobile device 302. For example, if the merchant ID 312 is identified as being associated with a recognized merchant (i.e., a merchant having had a previous transaction with a current user of the wireless mobile device), the wireless mobile device 302 will respond based upon a set of instructions included in the customer preference file 316 corresponding to a recognized merchant. Conversely, if the merchant ID 312 is identified as belonging to that of an unrecognized merchant (i.e., having had no previous transaction), the response is based upon another set of instructions associated with an unrecognized merchant.

Figure 4:
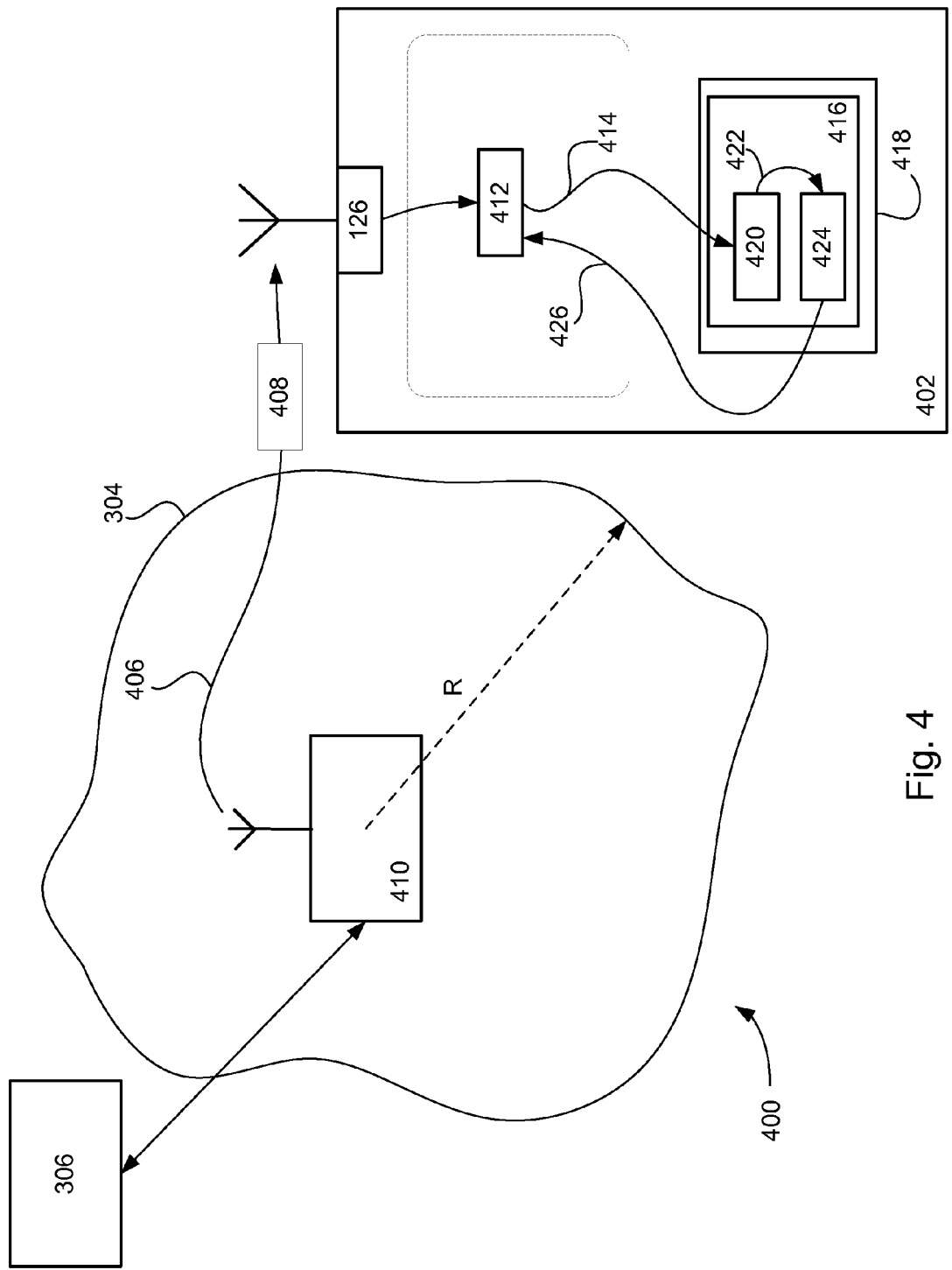
FIG. 4 illustrates the wireless mobile device implemented as a wireless media player in accordance with an embodiment of the invention.

FIG. 4 illustrates the wireless mobile device 302 implemented as a wireless media player 402 in accordance with an embodiment of the invention. When within the range R of wireless data network 304, the wireless media player 402 receives a ping signal 406 that includes a merchant ID 408 that uniquely identifies a merchant 410. A processor 412 in the wireless media player 402 receives the merchant ID 408 and sends a merchant ID recognition query 414 to a database 416 stored in a memory device 418 located in the media player 402. The database 416 includes a list of merchants 420 that are considered to be recognized by the user having a customer ID 422. In order to ascertain whether or not the merchant ID 408 is recognized, the merchant ID 408 is compared to the merchant IDs included in the list of merchants 420. If there is a hit (i.e., a match) the merchant 410 is considered to be recognized, otherwise the merchant 410 is considered to be unrecognized. In any case, once the status of the merchant 410 is determined, a fetch instruction command 422 is forwarded to a customer preference file 424 that responds by providing an instruction command 426 to the processor 412 based upon whether or not the merchant 410 is recognized.

The instruction command 426 (when executed by the processor 412) directs the wireless media player 402 to take a predetermined action in response to the received ping signal 406. For example, if the merchant 410 is unrecognized, a user can tailor the customer preference file 424 to issue an instruction command that directs the wireless media player 402 to ignore the ping signal 406. Alternatively, the user could tailor the customer preference file 424 to issue an instruction command to update the list of merchants 420 to include the unrecognized merchant ID 408 thereby changing the merchant status from unrecognized to recognized.

Figure 5:
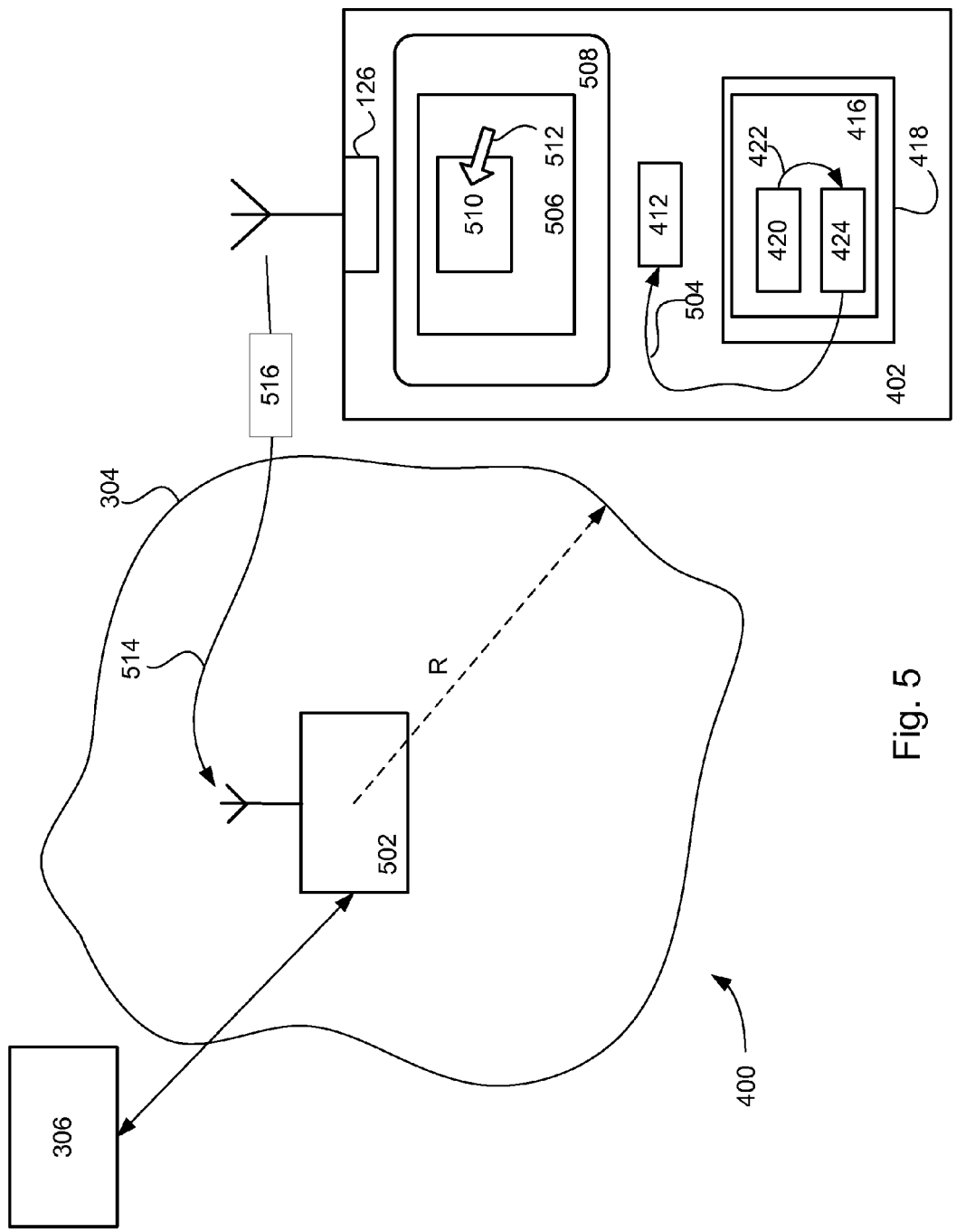
FIG. 5 illustrates an example of the wireless media player receiving the ping signal from a recognized merchant in accordance with an embodiment of the invention.

FIG. 5 illustrates an example of the wireless media player 402 receiving the ping signal 406 from a recognized merchant 502 in accordance with an embodiment of the invention. In this example, an instruction command 504 is issued from the customer preference file 424. The instruction command 504 is passed to and executed by the processor 412, which in turn directs the wireless media player 402 to open a graphical user interface (GUI) 506 on a display 508 that includes a list of items 510 previously purchased from the merchant 502 stored in the memory 418. In the described embodiment, each displayed item responds to a selection tool 512 by causing the wireless media player 402 to send a selection request 514 that includes an indication 516 of the item selected from the list 510 to the merchant 502 for additional processing. It should be noted that, typically, the list of items previously purchased by the user is stored locally in the memory 418. However, in some cases it may be desirable to store customer information (such as the list of previously purchased items) on either or both the local server 306 or the central server 202. In this way, even in those cases where a user purchases a new item or is using a different media player than would otherwise be used that does not have a current, or accurate, customer preference file for that particular user, the local server 306 or remote server 202 can be used to update, or synchronize, the local memory 418.

It should be noted that the customer preference file 424 can be as dense or sparse as desired based on, for example, an amount of on-board memory storage available, personal preferences of a user, etc. In some cases, the wireless media player 402 can have more than one user associated with it such as when two or more people share the wireless media player 402. In this case, each individual user would have a unique customer ID that would be entered manually by the user when they took current possession of the player 402. When multiple customer IDs are available, then each customer ID can point to a particular customer preference file unique to that customer ID.

In some cases, whenever a wireless media player comes within range of the wireless data network, the wireless media player can be (unbeknownst to the user) directed to send a wireless media player identifier that uniquely identifies the particular wireless media player to the wireless data network. The wireless media player identifier can be used to track lost or stolen media players when the rightful owner has placed the wireless media player identifier in a central database of lost or stolen media players. In this way, if a lost or stolen media player is tracked, any number of subsequent actions can be taken such as notifying the authorities, disabling the wireless media player, displaying a notice to return the wireless media player, etc. thereby providing a strong disincentive for stealing the player.

Figure 6:
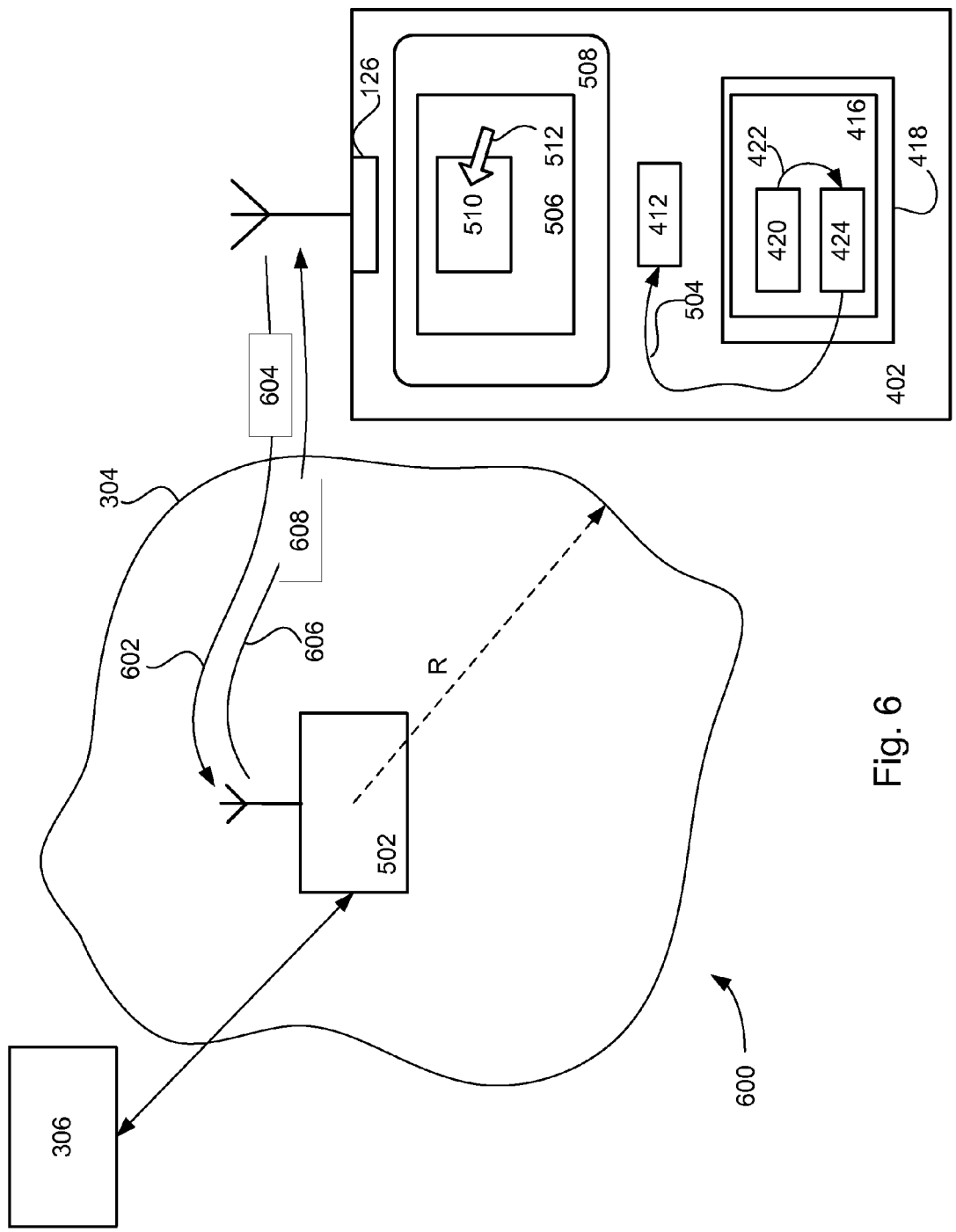
FIG. 6 illustrates an example of the wireless media player receiving the ping signal from the recognized merchant in accordance with an embodiment of the invention.

FIG. 6 illustrates an example of the wireless media player 402 receiving the ping signal 406 from the recognized merchant 502 in accordance with an embodiment of the invention. In this case, processor 412 directs the wireless media player 402 to generate and forward to the merchant 502 a request 602 with an instruction 604 that directs the merchant 502 to generate a merchant response 606 that includes information 608 that is pushed to the wireless media player 402. In this example, the information 608 is displayed on the graphical user interface (GUI) 506 as the list of previously purchased items 510 thereby providing the user the capability of selecting those item(s) from the list 510 along the lines previously discussed.

Therefore, by providing a simple modification to the customer preference file 424, any transaction between the merchant and the current user of the wireless media player 402 can be customized as appropriate. For example, if a user desires to enter into a transaction with only particular merchants, then only those merchants whose merchant IDs are stored in the customer preference file will be allowed to open a channel with the user. Alternatively, some customers may prefer that no merchant advertisements can be forwarded whereas in some cases, the user may prefer advertisements but only for a limited number of products. By tailoring the customer preference file for each customer and merchant, the user can provide as much control as desired in the information provided from and/or to a particular merchant or merchant class (i.e. category of merchants, such as food providers, etc).

Figure 7:
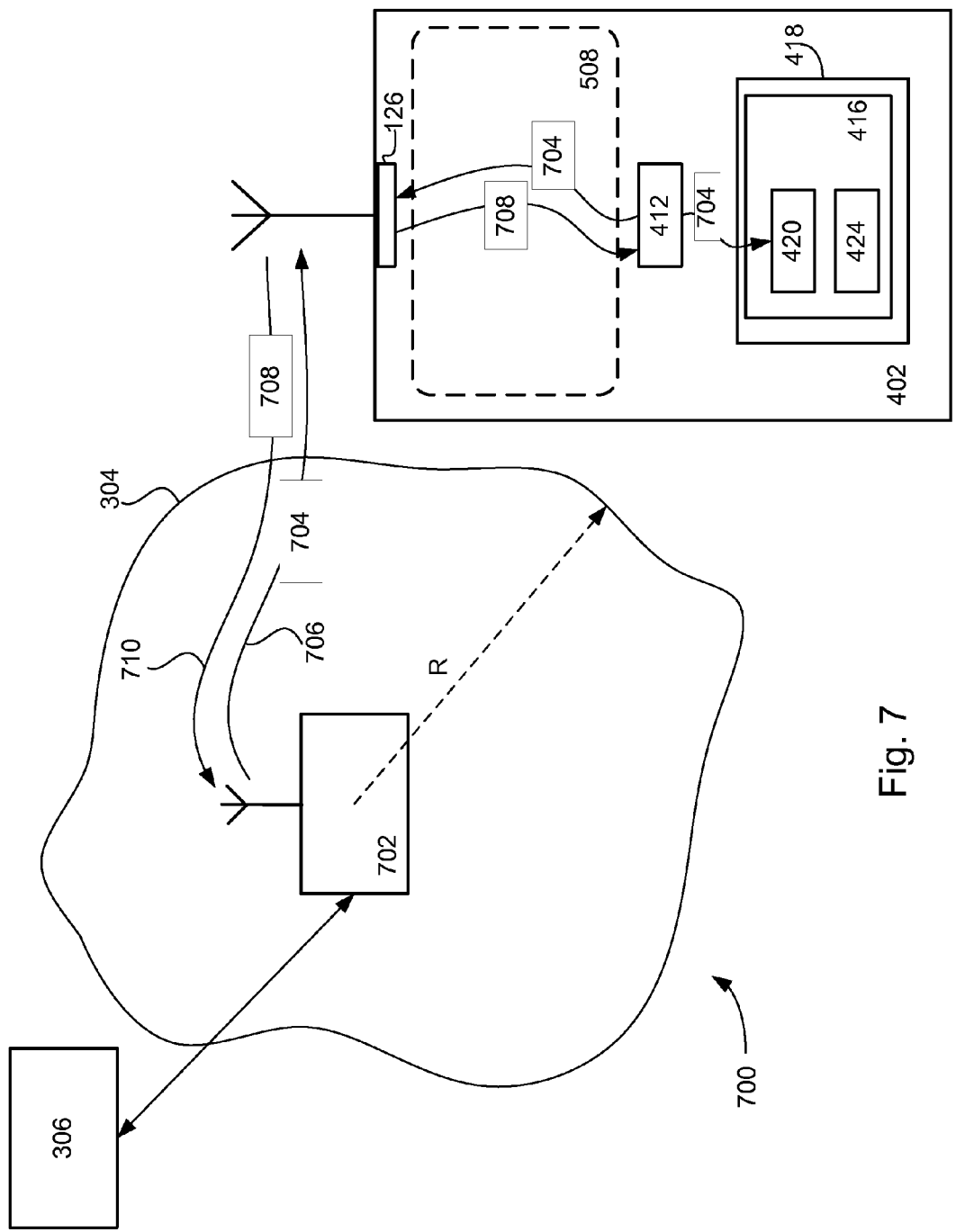
FIG. 7 shows a updating a merchant status in accordance with an embodiment of the invention.

In yet another scenario shown in FIG. 7, a merchant 702 is unrecognized. In this case, the media player 402 uses a merchant ID 704 included in a ping signal 706 to update the list of merchants 420 thereby changing the status of the merchant 702 from unrecognized to recognized. In this particular embodiment, once the list of merchants 420 has been updated to include the merchant ID 704, the wireless media player 402 sends a media player response 708 with an acknowledgement 710 of the receipt of the ping signal 706 to the merchant 702. In some cases, in addition to the acknowledgment 710, the media player response 708 can include a merchant request 712 requesting that the merchant 702 send any information, such as advertisements, daily specials, or other enticements that the merchant 702 believes would induce the user to place an order. In this way, the newly recognized merchant 702 can provide the database 416 with information specific to the merchant 702 so as to facilitate a current or future transaction.

Figure 8:
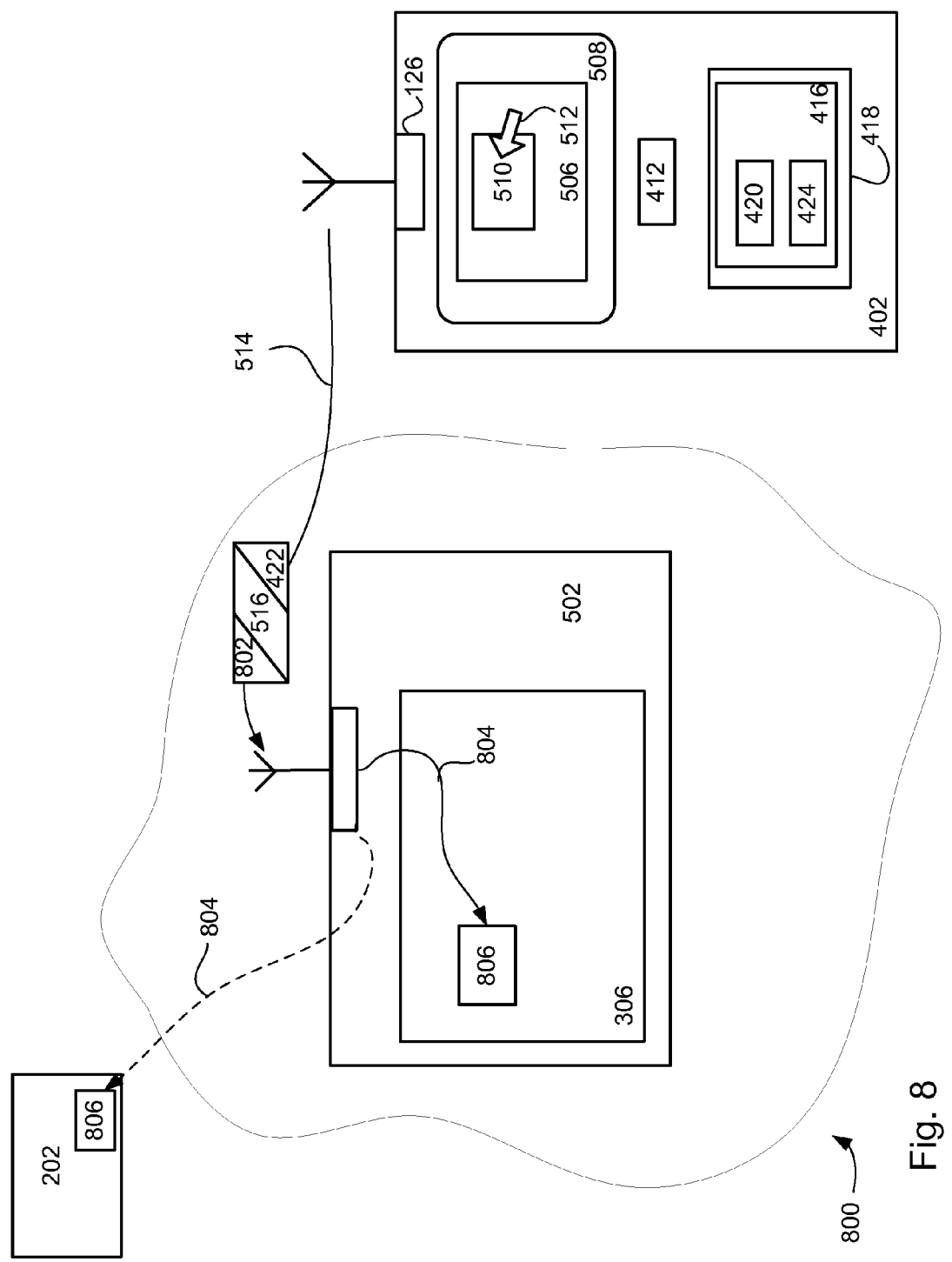
FIG. 8 illustrates a purchase transaction in accordance with an embodiment of the invention.
Figure 9:
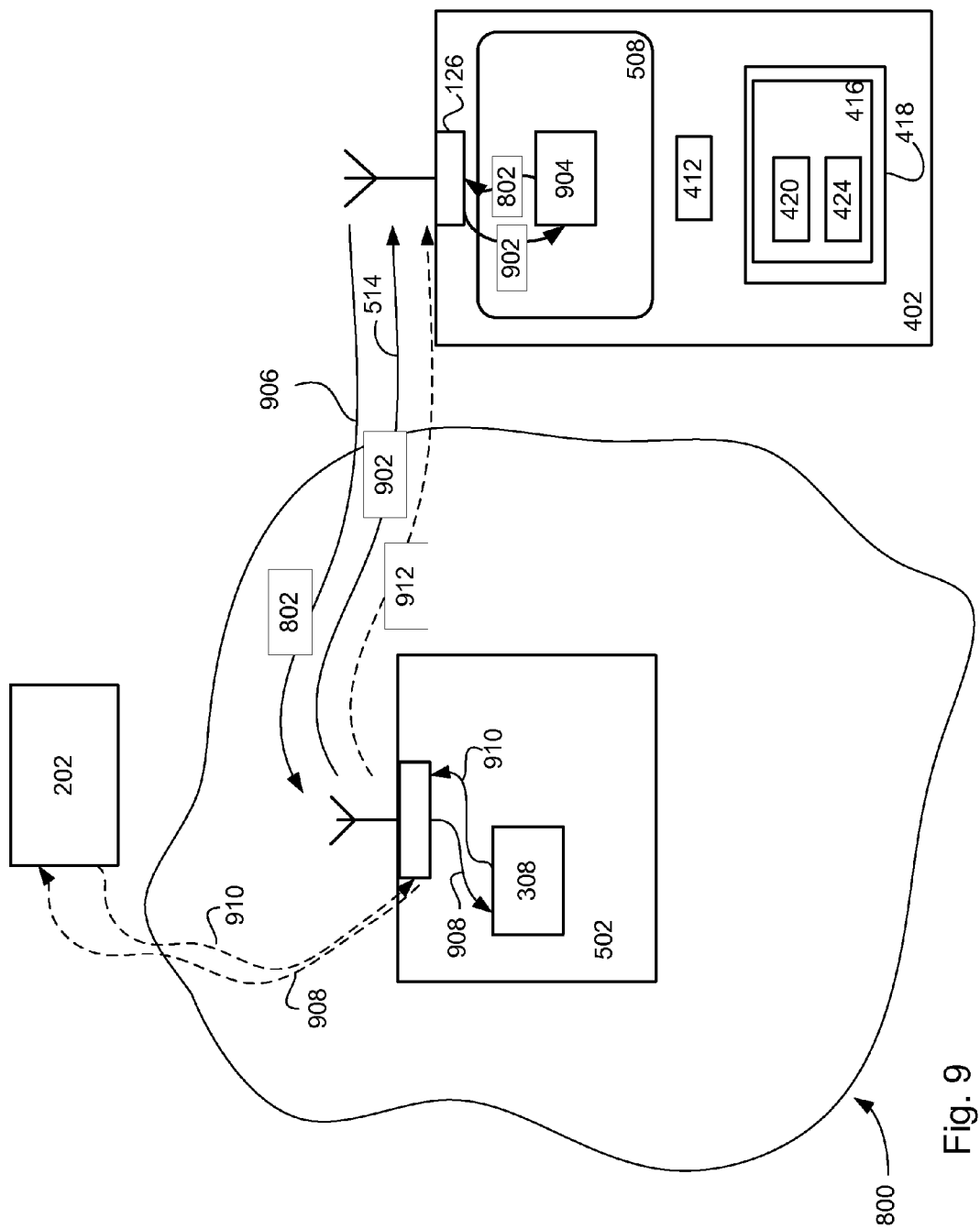
FIG. 9 illustrates authenticating a customer in accordance with an embodiment of the invention.

FIG. 8 illustrates a purchase transaction 800 in accordance with an embodiment of the invention. It should be noted that the list of selectable items 510 can originate from the memory 418, the local server 308 or the central server 202. Accordingly, starting where FIG. 5 left off where a user has selected an item to purchase from the list of selectable items 510, the wireless media player 402 sends the purchase request 514 having the purchase item indicator 516, the customer ID 422, and an authentication code 802 to the merchant 502. As illustrated in FIG. 9, the merchant 502 then proceeds to authenticate the customer ID 422 associated with the purchase request 514 by verifying the authentication code 802. If the purchase request 514 did not have an authentication code 802 associated with it (i.e., a null field), then the merchant 502 sends an authentication request 902 back to the wireless media player 402. The wireless media player 402 then displays an authentication request icon 904 on the display 508 requesting that the user provide a predetermined authentication code. In some cases, the authentication code can be a pre-selected number, name, combination of words and numbers, or any such combination. In response to the authentication request 902, the user inputs the appropriate authentication code 802, which is then forwarded back to the merchant 502 by the wireless media player 402 by way of an authentication response 906. Once the merchant 502 has received the authentication code 802, the merchant 502 forwards an authentication code verification request 908 to the local computer 306 (or the remote computer 202), which responds with an authentication code status 910. If the authentication code 802 is not verified, then a cancellation notice 912 is forwarded back to the wireless media player 402 canceling the transaction, otherwise, if the authentication code 802 is verified, the merchant 502 is allowed to proceed with the transaction 800.

Figure 10:
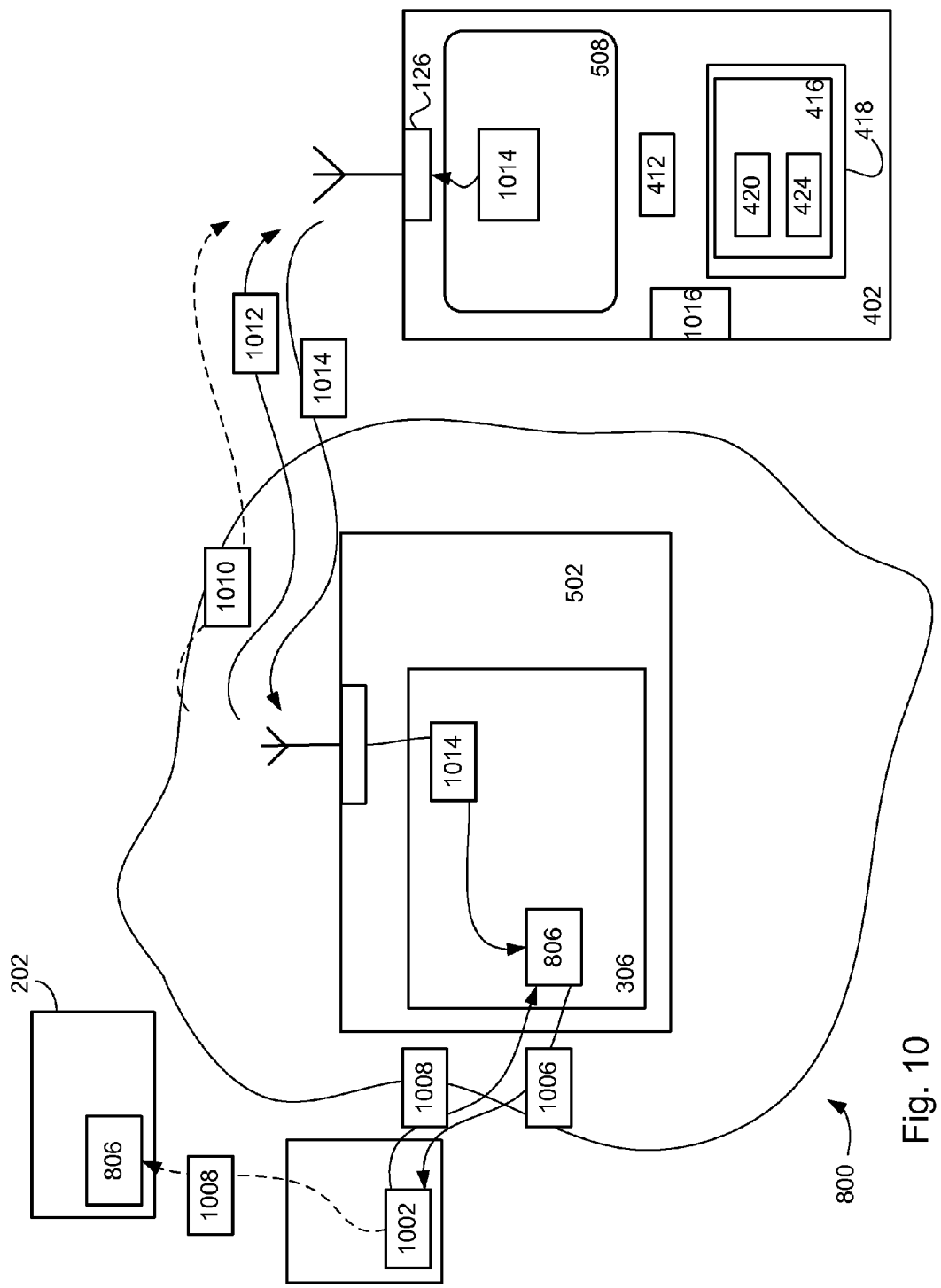
FIG. 10 illustrates dealing with a customer without sufficient funds in accordance with an embodiment of the invention.

Referring back to FIG. 8, if the authentication code 802 is verified, then an account enquiry 804 is made of a user account 806 associated with the customer ID 422 to determine if there is sufficient funds in the user account 806 to complete the requested purchase transaction 800. Again, the user account 806 can be stored in either the local computer 306 or the central server 202, thereby providing redundancy. Referring to FIG. 10, if the user account 806 does not have sufficient funds, then any number of actions can be taken. In one case, if the user has preauthorized access to another source of funds 1002 (such as a checking or savings account) located in a bank 1004, for example, then a request 1006 is forwarded to the bank 1004 to access the preauthorized source of funds 1002 from which a predetermined amount 1008 is transferred to the user account 806. If the preauthorized source of funds 1002 is either unavailable or insufficient to cover the predetermined transfer amount, then a cancellation notice 1010 is forwarded back to the wireless media player 402. In another embodiment, instead of a cancellation notice 1010, a request 1012 is forwarded to the wireless media player 402 requesting the user manually input a credit card number (either in written form using an input icon 1014, or verbally using a microphone 1016), for example, to cover the transaction. This could also apply in those situations where the user does not have a preauthorized account from which to draw additional funds when needed to replenish the user account.

In some cases, the user can direct that the user account 806 never fall below a specified amount thereby eliminating the possibility of a transaction being cancelled for lack of funds. In some cases, a notice can be forwarded to the wireless media player 402 indicating that the user account 806 has fallen to a preselected amount and requesting that the user either replenish the account or authorize a transfer from the preauthorized source of funds 1002.

Figure 11:
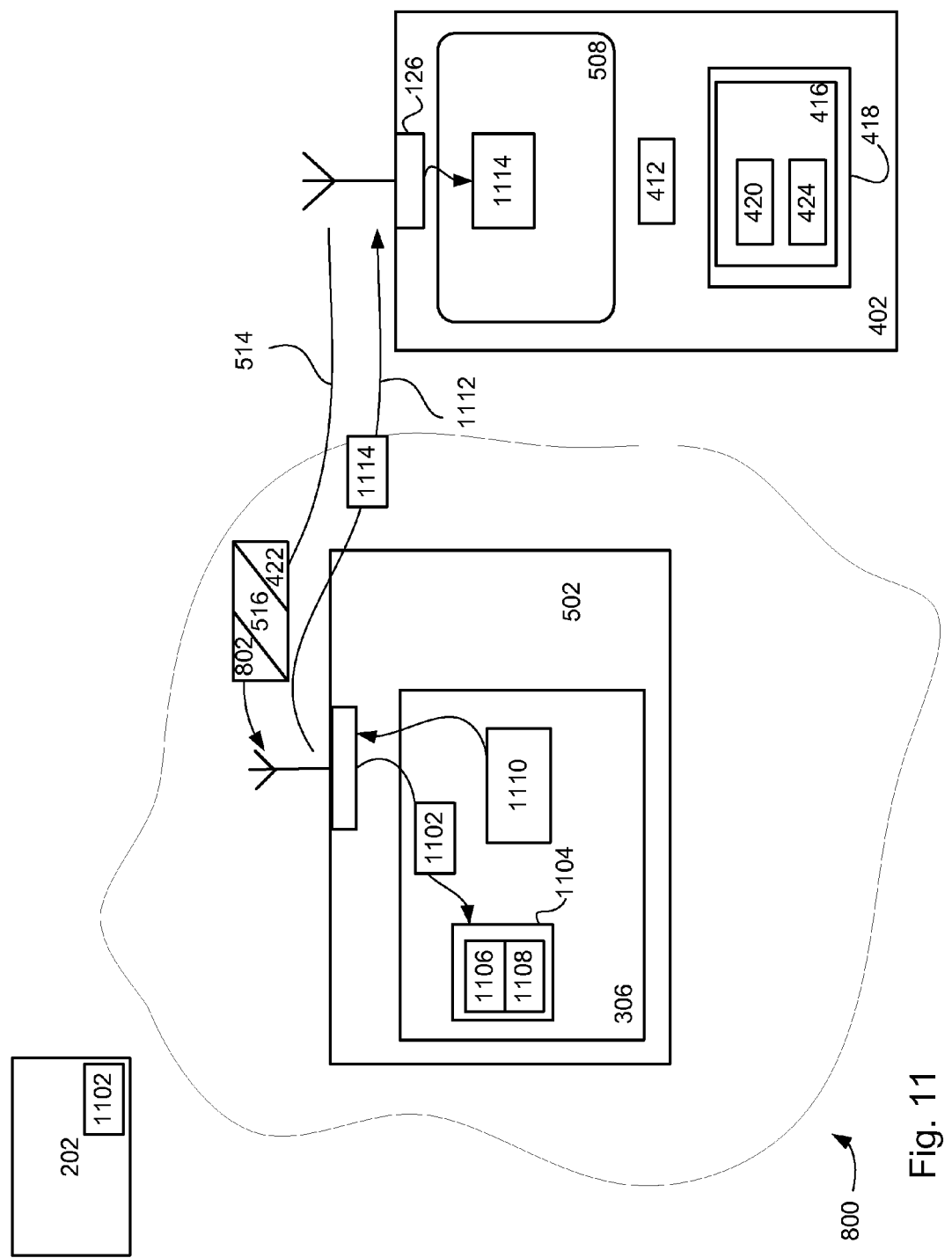
FIG. 11 shows how once a transaction has been authenticated and authorized the merchant sends a purchase inquiry in accordance with an embodiment of the invention.

Referring to FIG. 11, once the transaction 800 has been authenticated and authorized, the merchant 502 sends a purchase inquiry 1102 to a database 1104 (that can also be located on the central server 202) that includes a customer information file 1106 having information specific to the customer ID 422 and merchant information 1108 (based upon merchant IDs). The customer information file 1106 can include such information as customer purchase history, customer product preferences (coffee with room for cream, for example), etc.; whereas the merchant information 1108 can include such information as current menu items, specialty menu items, and any other information that a particular merchant deems relevant. Using the information included in the customer preference file 1106, a processing queue 1110 is updated to include the item(s) purchased and any particular customer preferences (such as room for cream, particular temperature if its a hot drink, etc.). Once the processing queue 1110 has been updated, the merchant 502 sends a purchase confirmation 1112 having information 1114 related to the purchase that is displayed on the display 508. Such information can include an estimate of the time for pickup in either textual or iconic form (such as a clock face), the item ordered, the price, and any other information that the merchant 502 deems appropriate. In some situations, the user can specify a particular time to pick up the selected items as opposed to the merchant 502 specifying the pick up time. In some cases, the merchant may decide to give a remote purchaser priority over those who purchased the same or similar items locally at the merchant's place of business. In any case, once the user has the verification notification and estimated time for pickup, the user can go directly to the pickup station at the merchant without having to waste time waiting for an unfinished order or arriving after a order has been finished and has lost its freshness.

Figure 12:
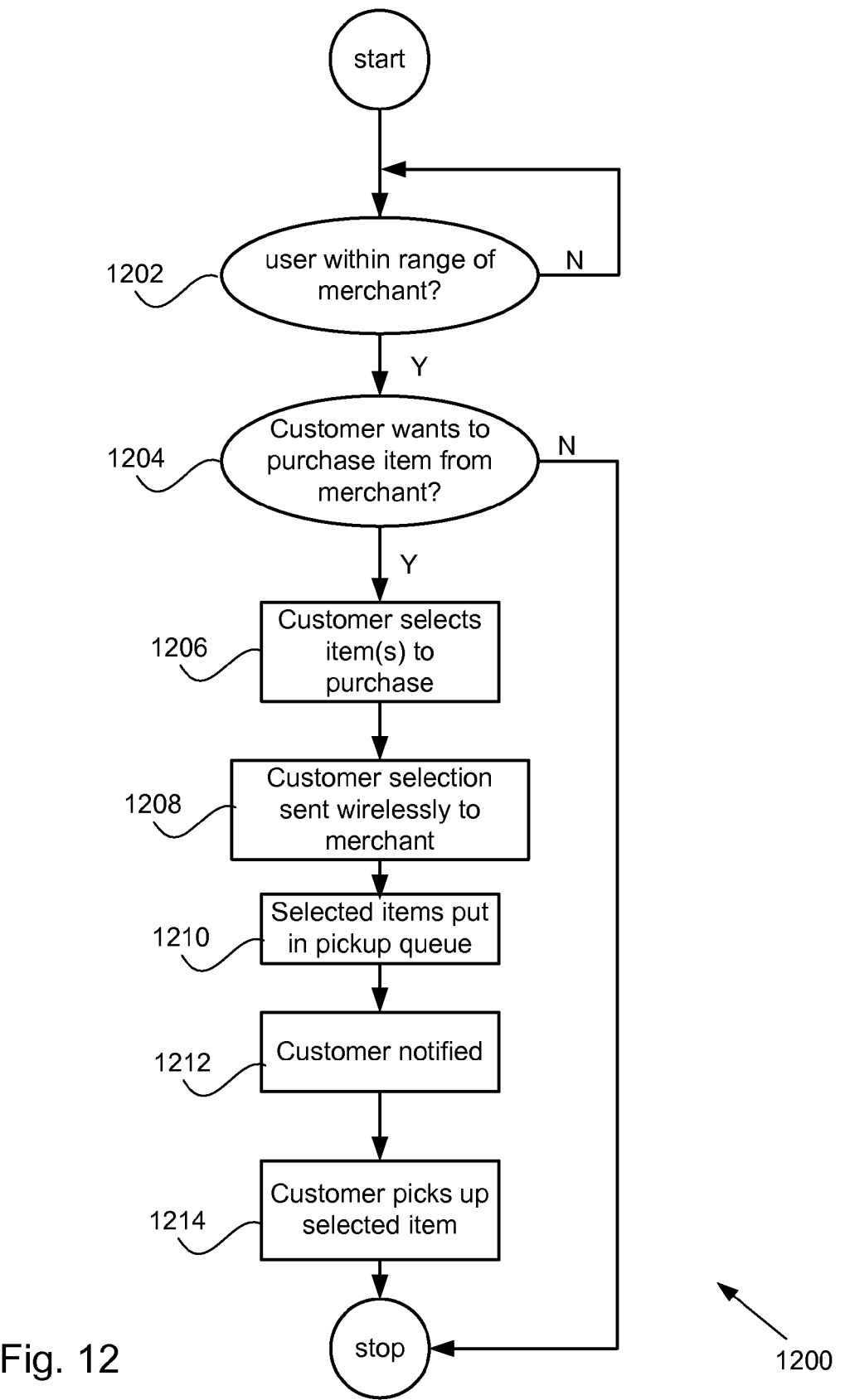
FIG. 12 shows a flowchart detailing a process for a wireless transaction in accordance with an embodiment of the invention.

FIG. 12 shows a flowchart detailing a process 1200 for a wireless transaction in accordance with an embodiment of the invention. At 1200, if a user having a wireless client device is within wireless range of a merchant and if the user wants to purchase an item for sale by the merchant at 1204, then the user selects the item to purchase using the wireless client device at 1206. An indication of the item selected is wirelessly forwarded to the merchant at 1208 and an order queue is subsequently updated at 1210. Once the order queue has been updated, a notification is sent from the merchant to the wireless client device at 1212 notifying the user that the selected item has been queued up. In some embodiments, the notification includes more specific information related to the transaction such as a time for pickup, etc. At 1214, the user picks up the selected item at the merchant thereby completing the wireless transaction.

Figure 13:
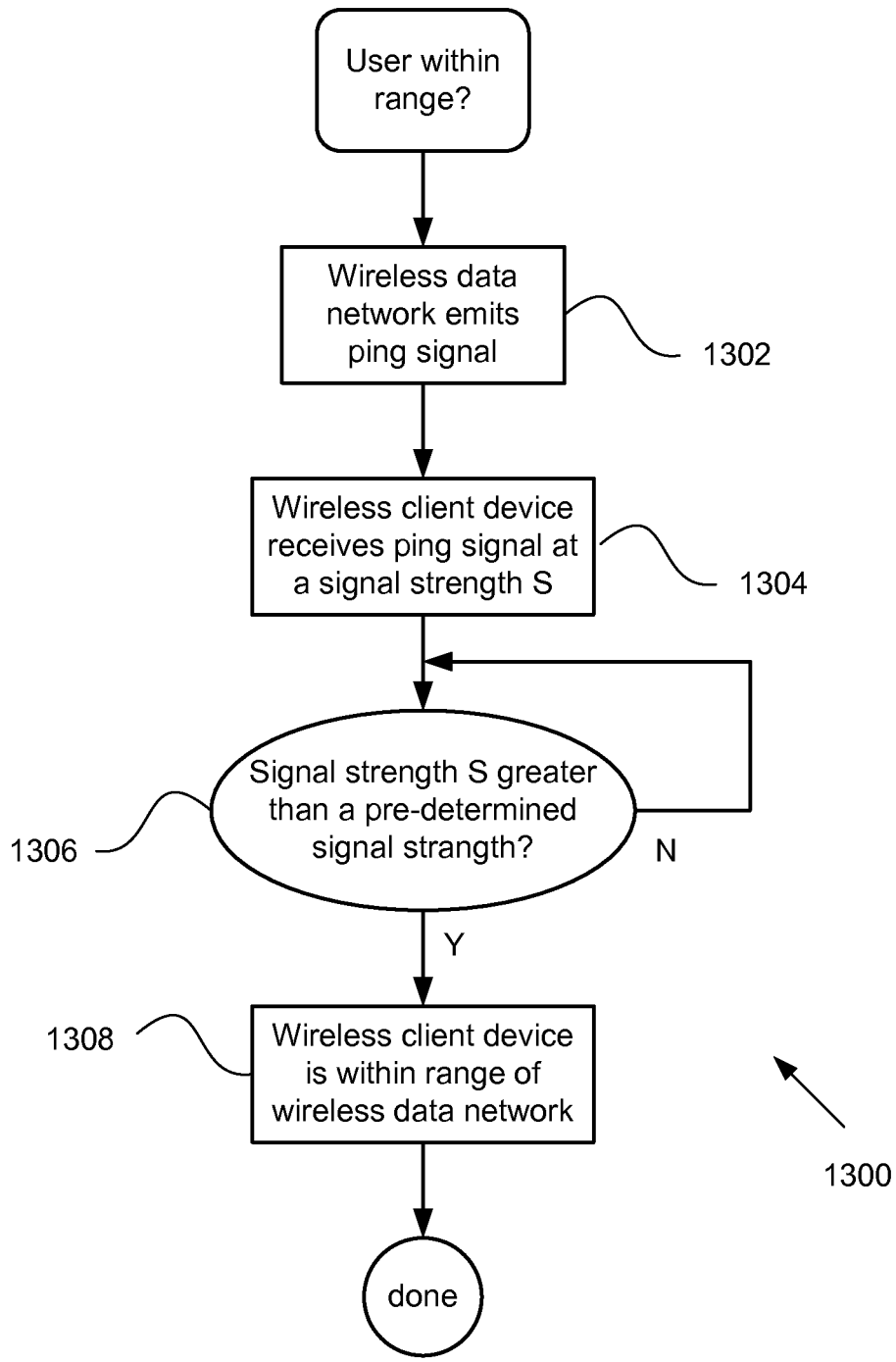
FIG. 13 shows a flowchart detailing a process for determining if a wireless client device is within range of a wireless data network in accordance with an embodiment of the invention.

FIG. 13 shows a flowchart detailing a process 1300 for determining if a wireless client device is within range of a wireless data network in accordance with an embodiment of the invention. The process 1300 begins at 1302 with the wireless data network emitting a ping signal. At 1304, the wireless client device receives the ping signal having a signal strength S. If, at 1306, the signal strength S is greater than a predetermined signal strength value, then at 1308 the wireless client device is within range of the wireless data network.

Figure 14:
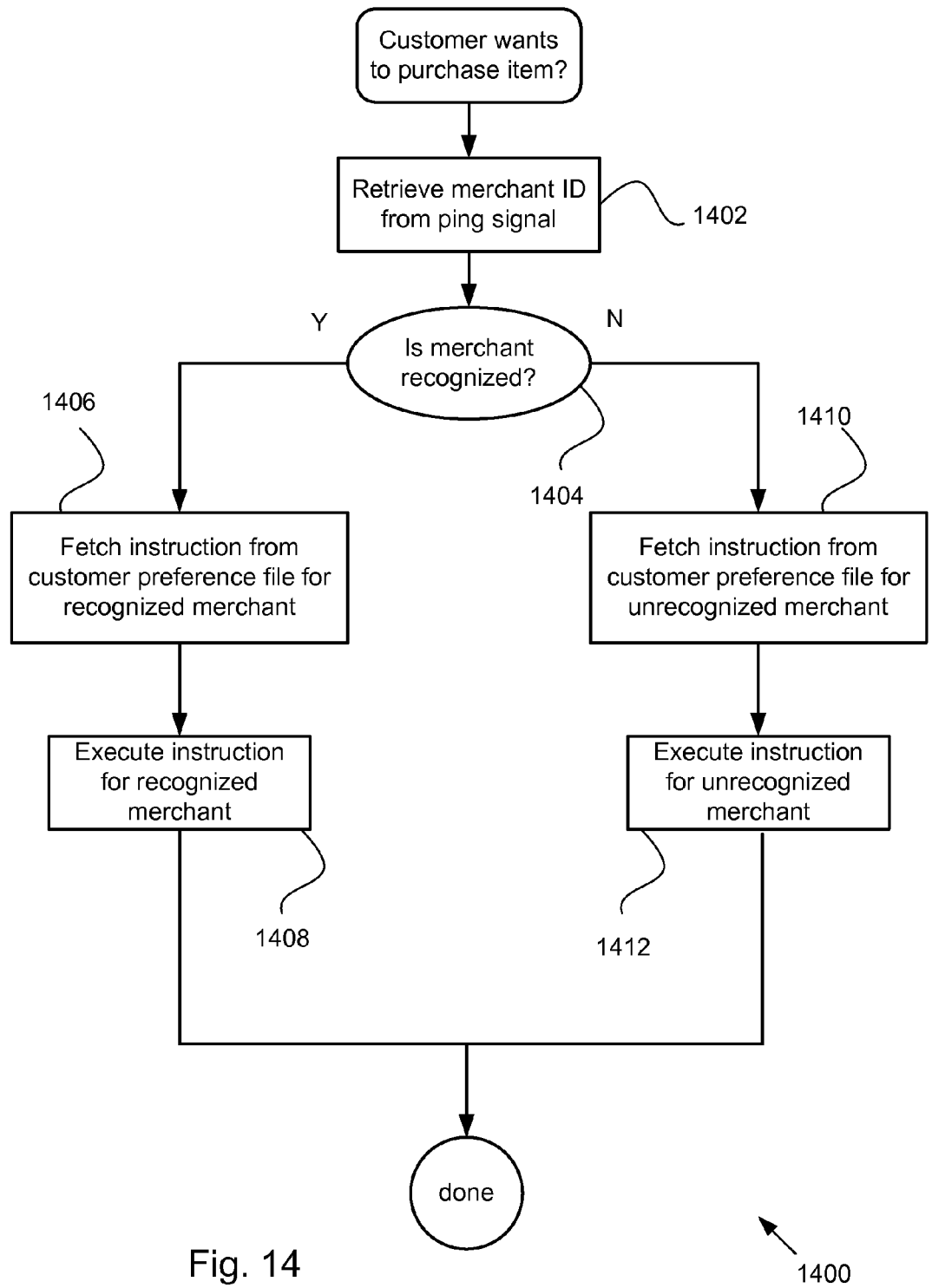
FIG. 14 shows a flowchart detailing a process for determining if a merchant is a recognized merchant or an unrecognized merchant in accordance with an embodiment of the invention.

FIG. 14 shows a flowchart detailing a process 1400 for determining if a merchant is a recognized merchant or an unrecognized merchant in accordance with an embodiment of the invention. The process 1400 begins at 1402 by retrieving a merchant ID from the received ping signal and, at 1404, determining if the merchant ID is associated with a previously recognized merchant or an unrecognized merchant. If the merchant ID is associated with a previously recognized merchant, then at 1406, an instruction for a previously recognized merchant is fetched from a customer preference file and the fetched instruction is executed at 1408.

On the other hand, if it had been determined at 1404 that the merchant ID is associated with an unrecognized merchant, then at 1410 an instruction associated with an unrecognized merchant is fetched from the customer preference file at 1412 and executed at 1414.

Figure 15:
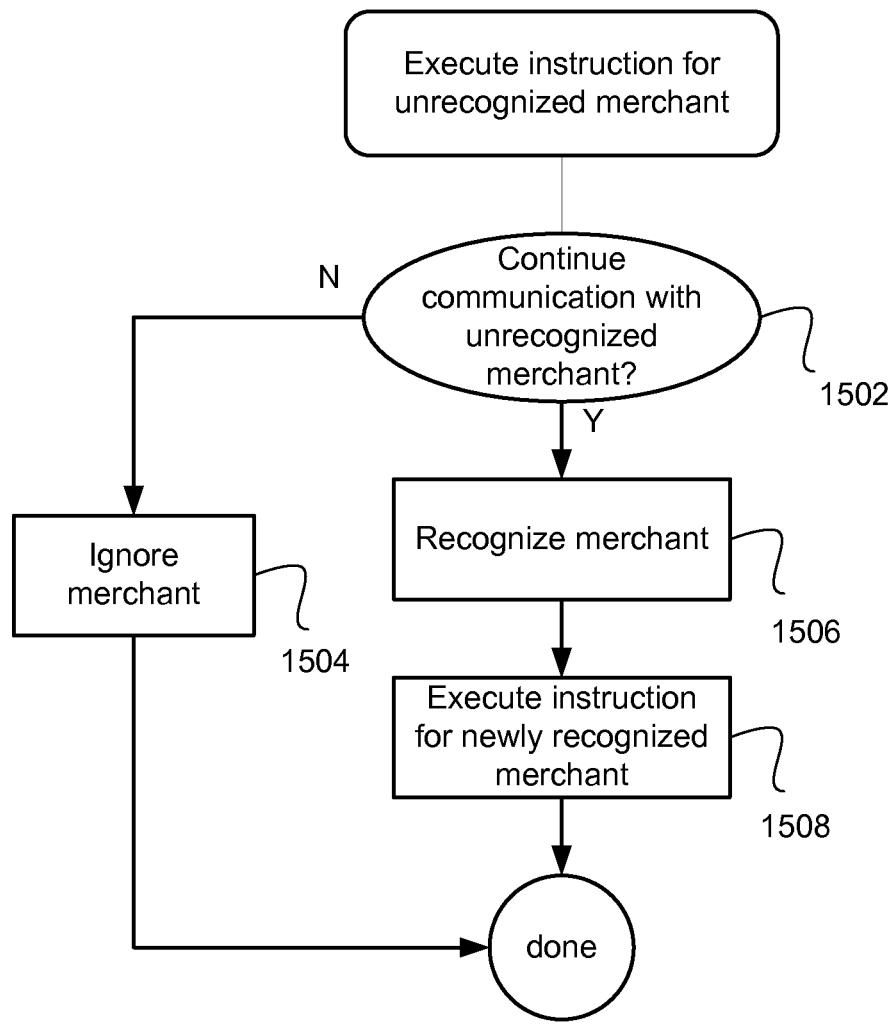
FIG. 15 shows a flowchart detailing a process responding to a merchant in accordance with an embodiment of the invention.

FIG. 15 shows a flowchart detailing a process 1500 of responding to a merchant in accordance with an embodiment of the invention. The process 1500 begins at 1502 by determining if the wireless client device is to remain in communication with the unrecognized merchant. If it is determined that communication is to cease, then the unrecognized merchant is ignored at 1504 and the process 1500 stops, otherwise, the unrecognized merchant is recognized at 1506. In the described embodiment, the recognition of the heretofore unrecognized merchant can be accomplished by updating the customer preference file to include the merchant ID associated with the heretofore unrecognized merchant. At 1508, an instruction associated with the newly recognized client is executed that can include requesting specific merchant information from the merchant such as a list of current menu items that is, in turn, used to update a merchant information file and the customer preference file stored in the wireless client device.

Figure 16:
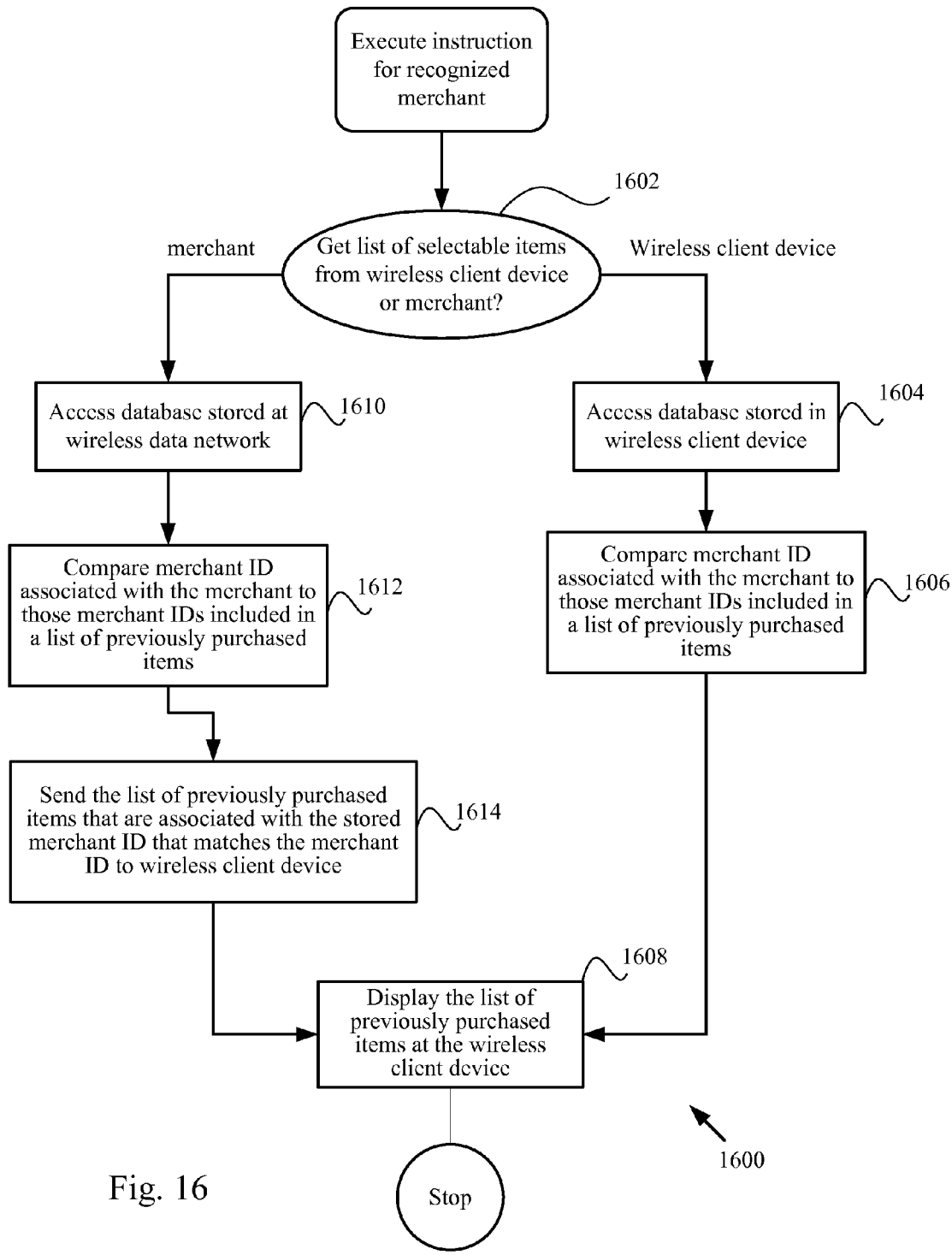
FIG. 16 shows a flowchart detailing a process for responding to instruction for a recognized merchant in accordance with an embodiment of the invention.

FIG. 16 shows a flowchart detailing a process 1600 for responding to an instruction from a recognized merchant in accordance with an embodiment of the invention. The process 1600 begins at 1602 by getting a list of selectable items from either the merchant or from the wireless client device. In the case that the list of selectable items is from the wireless client device, a database stored in the wireless client device is accessed at 1604 which includes a list of previously purchased items. The merchant ID associated with the merchant is then compared to those merchant IDs included in the list of previously purchased items at 1606 and, at 1608, the list of previously purchased items that are associated with the stored merchant ID that matches the current merchant ID are displayed on a display.

On the other hand, when the list of selectable items is obtained from the merchant, then at 1610 a database stored in the wireless data network is accessed, which includes a list of purchased items associated with a customer ID that uniquely identifies a previous customer. At 1612, a list of stored customer IDs is compared with the current customer ID and at 1614, the list of selectable items associated with the stored customer ID that matches the current customer ID is sent from the wireless data network to the wireless client device. The list of selectable items is then displayed at 1608.

Figure 17:
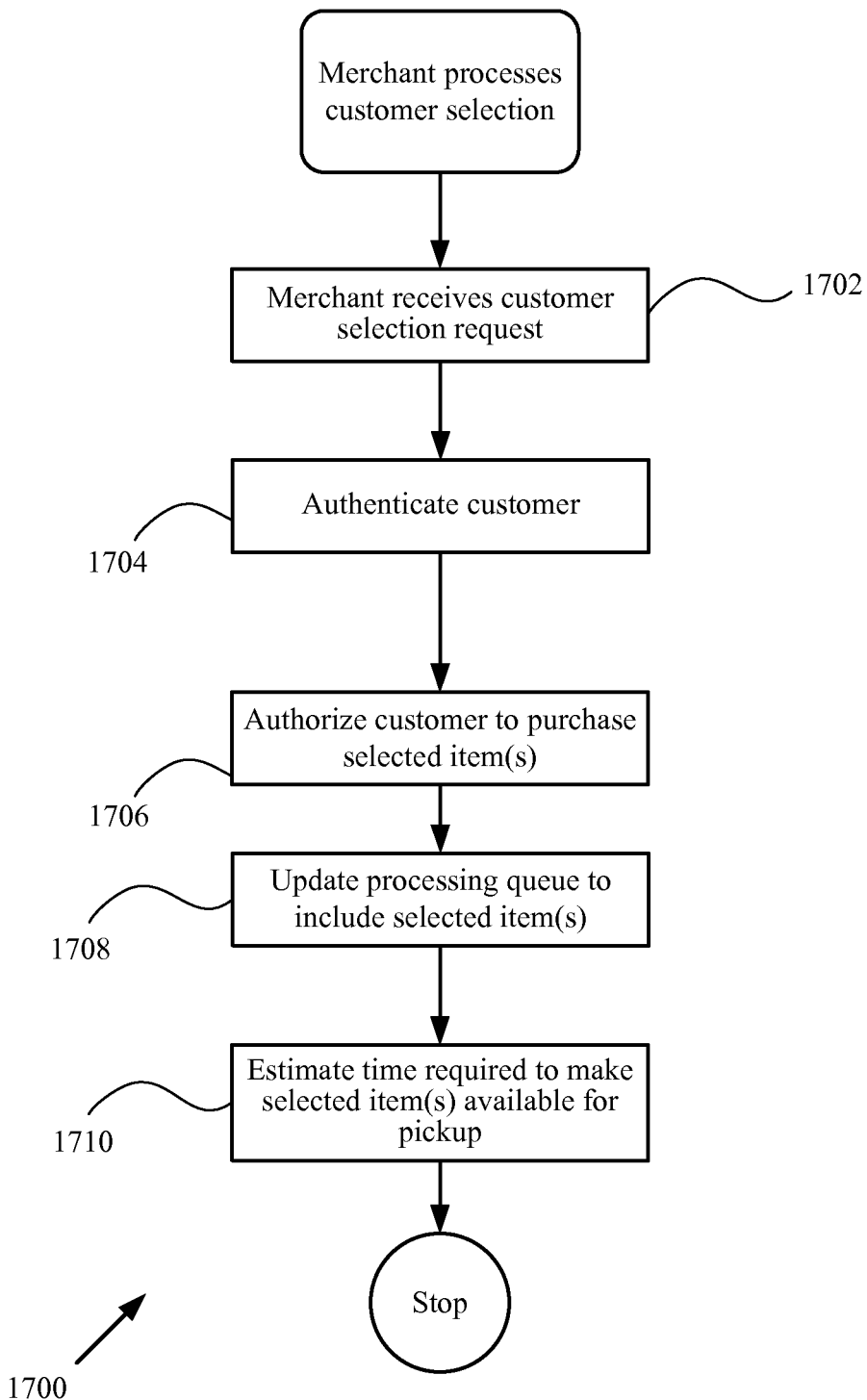
FIG. 17 shows a flowchart detailing a process for processing a customer selection by a merchant in accordance with an embodiment of the invention.

FIG. 17 shows a flowchart detailing a process 1700 for processing a customer selection by a merchant in accordance with an embodiment of the invention. The process 1700 begins at 1702 with the merchant receiving a customer selection request that includes an indication of the item(s) selected, an authentication code, and a customer ID. At 1704, the customer is authenticated and at 1706 the customer is authorized to purchase the selected item(s). At 1708 a processing queue is updated to include indicators of the selected item(s). At 1710, an estimate of an amount of time required to make the selected item(s) available for pickup is calculated.

Figure 18:
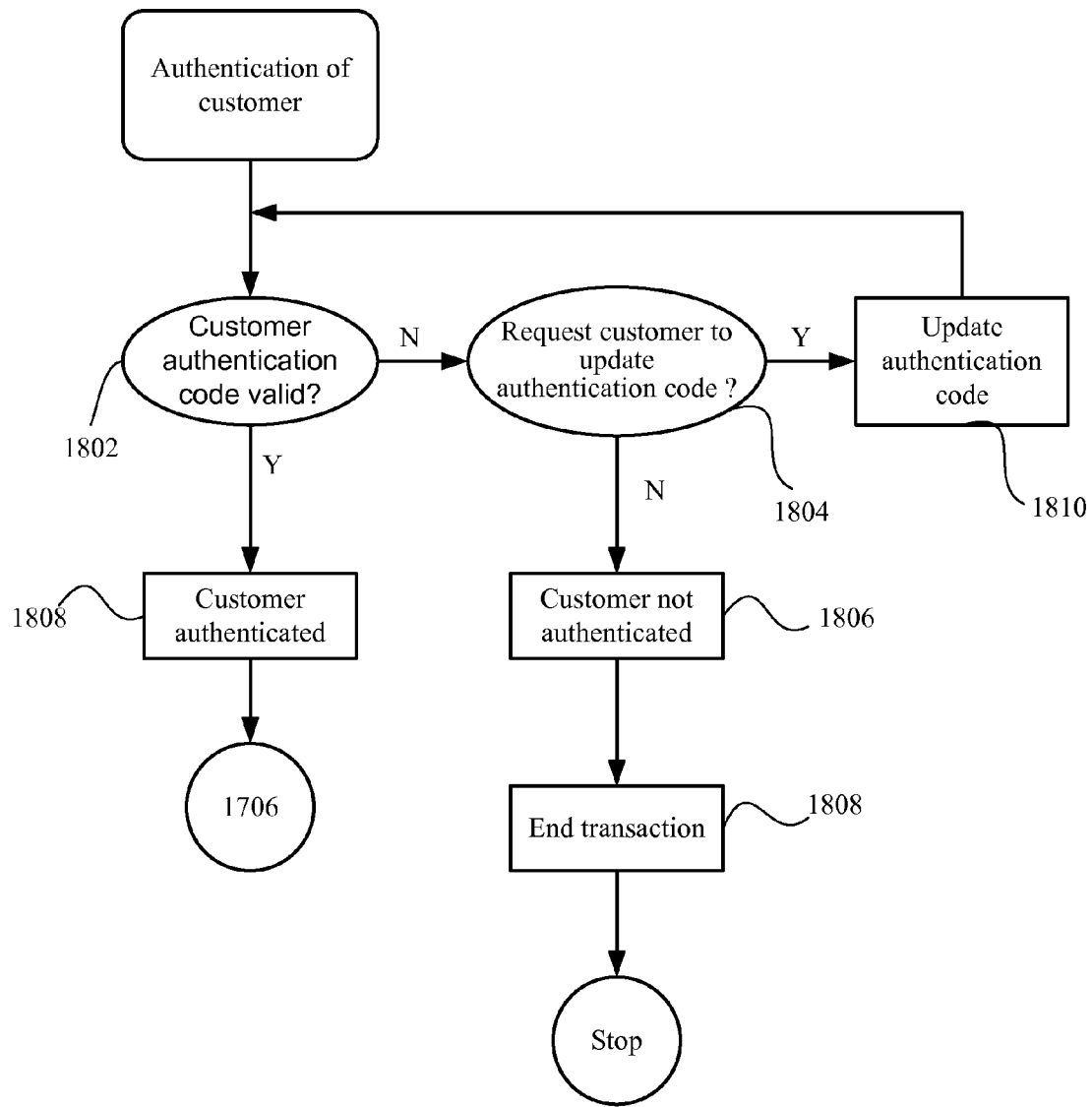
FIG. 18 shows a flowchart detailing a process for authenticating a customer in accordance with an embodiment of the invention.

FIG. 18 shows a flowchart detailing a process 1800 for authenticating a customer in accordance with an embodiment of the invention. The process 1800 begins at 1802 by determining if a customer authentication code is valid. If the authentication code is not valid, then a determination is made at 1804 of whether or not the customer is to be requested to supply a valid authentication code. If the customer is not requested to supply a valid authentication code, then the customer is tagged as unauthenticated at 1806 and the transaction is ended at 1808 thereby ending the process 1800. On the other hand, if at 1804 the customer is requested to supply a valid authentication code, then at 1810, an authentication code request is forwarded to the customer at the wireless client device and control is passed back to 1802 for a determination of the validity of the authentication code. If the received authentication code is determined to be valid at 1802, then at 1812, the customer is tagged as authenticated and control passes back to the process 1700.

Figure 19:
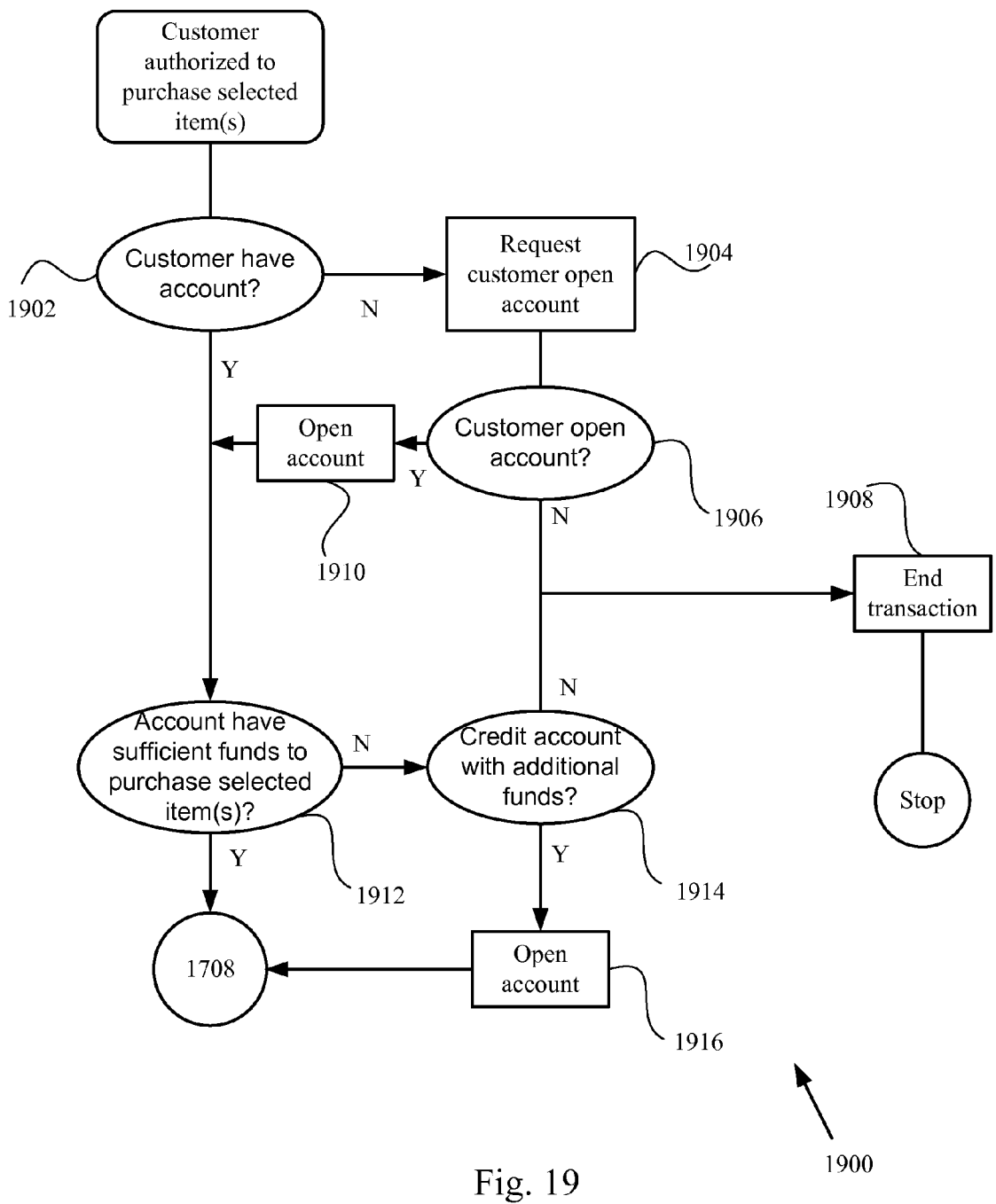
FIG. 19 shows a flowchart detailing a process for authorizing a customer to purchase the selected item(s) in accordance with an embodiment of the invention.

FIG. 19 shows a flowchart detailing a process 1900 for authorizing a customer to purchase the selected item(s) in accordance with an embodiment of the invention. The process 1900 begins at 1902 by determining if the customer has a valid customer account. If the customer does not have a valid customer account, then at 1904 a request is forwarded from the wireless data network to the customer requesting that the customer open a customer account. If, at 1906, the customer chooses to not open an account, then the transaction is ended at 1908, otherwise, at 1910, a customer account is opened. On the other hand, if at 1902 it has been determined that a customer does have a valid customer account, then a determination is made at 1912 of whether or not the customer account has sufficient funds to purchase the selected item(s). If the customer account does not have sufficient funds, then at 1914 the customer is requested to credit sufficient funds to the customer account. If the customer does not credit sufficient funds, then the transaction is ended at 1908, otherwise, the account is credited with sufficient funds at 1916. In any case, if the customer account has sufficient funds to purchase the selected item(s), either as determined at 1912 or credited at 1916, processing is passed to 1708.

The invention can be preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of ordering an item from an establishment using a wireless client device in the vicinity of the establishment, comprising:
   receiving a signal with an identifier from a wireless network at the wireless client device;
   comparing, at the wireless client device, a signal strength of the received signal with identifier from the wireless network to a threshold value;
   comparing, at the wireless client device, the received identifier to a list of identifiers to find a match when the signal strength exceeds the threshold value; and
   presenting, at the wireless client device, on a display screen of the wireless client device, if a match is found, an item ordering user interface;
   receiving, at the wireless client device, a user selection of a particular item of a plurality of items available for ordering via the item ordering user interface, the selection being made via the item ordering user interface;
   forming, at the wireless client device, a remote order request for the particular item in response to the user selection; and
   accessing order history data for the user of the wireless client device,
   wherein at least one of the plurality of items available for ordering via the item ordering user interface is a previously purchased item,
   wherein the user selection is the previously purchased item, and
   wherein the remote order request includes data from the order history data.

2. The method as recited in claim 1, wherein the notification includes at least an estimated amount of time until the particular item denoted by the remote order is available at the establishment.

3. The method as recited in claim 1, wherein the notification includes at least an estimated amount of time until the particular item denoted by the remote order is available for pick up at the establishment.

4. The method as recited in claim 1, wherein the notification indicates at least that the particular item denoted by the remote order is available at the establishment.

5. The method as recited in claim 1, wherein the wireless client device is a wireless client device selected from a group comprising: a wireless media player, a wireless personal digital assistant, or a cell phone.

6. The method as recited in claim 1,
   wherein the method further comprises:
   storing order history data for the user on the wireless client device.

7. The method as recited in claim 1, wherein the method further comprises:
   wherein the presenting operates to present the item ordering user interface on the display screen of the wireless client device when the signal is above the threshold and the identifier is found in the list of identifiers.

8. The method as recited in claim 1, wherein the method further comprises:

storing data on authorized establishments on the wireless client device.

9. The method as recited in claim 8, wherein the method further comprises:
storing distinct user data on the wireless client device in association with each of a plurality of the authorized establishments.

10. The method as recited in claim 1, wherein the method further comprises:
paying for the particular item via a user account of the user.

11. A method as recited in claim 1, wherein the method further comprises:
receiving, from the computing device associated with the establishment, information regarding at least one available item.

12. The method as recited in claim 1, wherein the method further comprises:
receiving, from the computing device associated with the establishment, information regarding advertisements unrelated to the establishment.

13. The method as recited in claim 1, wherein the receiving and the sending are performed when the wireless client device is external but proximate to the establishment.

14. The method as recited in claim 1, further comprising wirelessly sending the remote order request to a computing device associated with the establishment.

15. The method as recited in claim 1, further comprising:
wirelessly receiving, at the wireless client device, a notification from the computing device associated with the establishment; and
presenting the notification on the display screen of the wireless client device.

16. A method of ordering an item from an establishment using a wireless client device in the vicinity of the establishment, comprising:
receiving a signal with an merchantID from a wireless network at the wireless client device;
comparing, at the wireless client device, a signal strength of the received signal with merchantID from the wireless network to a threshold value;
ignoring, at the wireless client device, the signal when the signal strength does not exceed the threshold value, and
comparing, at the wireless client device, the received merchantID to a list of merchantIDs to find a match, when the signal strength exceeds the threshold value;
ignoring, at the wireless client device, the received signal if a match is not found;
accessing order preference data associated with the user of the wireless client device; and
presenting, on a display screen of the wireless client device, an item ordering user interface associated with the merchantID;
receiving, at the wireless client device, a user selection of a particular item of a plurality of items available for ordering via the item ordering user interface, the selection being made via the item ordering user interface; and
forming, at the wireless client device, a remote order request for the particular item in response to the user selection, the remote order request being based on or including data from the order preference data.

17. The method as recited in claim 16, wherein the method further comprises:
storing order preference data for the user on the wireless client device.

18. The method as recited in claim 1, wherein the method further comprises:
receiving, at the wireless client device, an acknowledgement of the remote order request from the computing device associated with the identifier.

19. The method as recited in claim 16, wherein the method further comprises:
storing distinct order preference data on the wireless client device for each of a plurality of establishments, and
wherein the accessing of the order preference data associated with the user of the wireless client device comprises accessing the order preference data pertaining to the establishment that has been recognized.

20. The method as recited in claim 16, further comprising wirelessly sending the remote order request to a computing device associated with the establishment.

21. The method as recited in claim 16, further comprising:
wirelessly receiving, at the wireless client device, a notification from the computing device associated with the establishment; and
presenting the notification on the display screen of the wireless client device.

22. A non-transitory computer readable medium including at least instructions that when executed by a wireless client device provides for ordering an item from an establishment, comprising:
instructions for receiving a signal with an identifier from a wireless network at the wireless client device;
instructions for comparing, at the wireless client device, a signal strength of the received signal with identifier from the wireless network to a threshold value;
instructions for comparing, at the wireless client device, the received identifier to a list of identifier to find a match when the signal strength exceeds the threshold value;
instructions for presenting, on a display screen of the wireless client device, an item ordering user interface associated with the identifier;
instructions for receiving, at the wireless client device, a user selection of a particular item of a plurality of items available for ordering via the item ordering user interface, the selection being made via the item ordering user interface;
instructions for forming, at the wireless client device, a remote order request for the particular item in response to the user selection; and
instructions for accessing order history data for the user of the wireless client device,
wherein at least one of the plurality of items available for ordering via the item ordering user interface is a previously purchased item,
wherein the user selection is the previously purchased item, and
wherein the remote order request includes data from the order history data.

23. The non-transitory computer readable medium as recited in claim 22, wherein the non-transitory computer readable medium further comprises:
instructions for receiving, from the computing device associated with the establishment, information regarding advertisements unrelated to the establishment.

24. The non-transitory computer readable medium as recited in claim 22, wherein the non-transitory computer readable medium further comprises instructions for wirelessly sending the remote order request to a computing device associated with the establishment.

25. The non-transitory computer readable medium as recited in claim 22, wherein the non-transitory computer readable medium further comprises:
- instructions for wirelessly receiving, at the wireless client device, a notification from the computing device associated with the establishment; and
- instructions for presenting the notification on the display screen of the wireless client device.

26. A wireless portable electronic device, comprising:
- a processor for processing executable instructions;
- a display coupled to the processor for displaying text and images;
- a wireless interface coupled to the processor arranged to send and receive wireless signals; and
- a memory arranged to store data and the executable instructions,
- wherein the executable instructions include at least:
- instructions for receiving a signal with an identifier from a wireless network at the wireless client device;
- instructions for comparing, at the wireless client device, a signal strength of the received signal with identifier from the wireless network to a threshold value;
- instructions for comparing, at the wireless client device, the received identifier to a list of identifier to find a match when the signal strength exceeds the threshold value,
- instructions for presenting, on the display of the wireless portable electronic device, an item ordering user interface associated with the identifier;
- instructions for receiving a user selection of a particular item of a plurality of items available for ordering via the item ordering user interface;
- instructions for forming a remote order request for the particular item in response to the user selection; and
- instructions for accessing order preference data for the user of the wireless client device,
- wherein the remote order request is based on or includes data from the order preference data.

27. The wireless portable electronic device as recited in claim 26, wherein the executable instructions further include instructions for sending, via the wireless interface, the remote order request to a computing device associated with the establishment.

28. The wireless portable electronic device as recited in claim 26, wherein the executable instructions further include:
- instructions for receiving, via the wireless interface, a notification from the computing device associated with the establishment; and
- instructions for presenting the notification on the display screen of the wireless client device.

* * * * *